United States Patent
Johnston et al.

(10) Patent No.: US 8,947,512 B1
(45) Date of Patent: Feb. 3, 2015

(54) USER WEARABLE VIEWING DEVICES

(75) Inventors: Eric R. Johnston, San Francisco, CA (US); David Bullock, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 526 days.

(21) Appl. No.: 13/176,946

(22) Filed: Jul. 6, 2011

Related U.S. Application Data

(60) Provisional application No. 61/361,881, filed on Jul. 6, 2010.

(51) Int. Cl.
H04N 13/04 (2006.01)

(52) U.S. Cl.
USPC .......................................................... 348/56

(58) Field of Classification Search
CPC ................. H04N 2013/0461; H04N 2213/008
USPC ..................................................... 348/52–58
See application file for complete search history.

(56) References Cited

U.S. PATENT DOCUMENTS

| | | | |
|---|---|---|---|
| 2007/0263003 A1* | 11/2007 | Ko et al. | 345/502 |
| 2010/0007582 A1 | 1/2010 | Zalewski | |
| 2010/0079676 A1* | 4/2010 | Kritt et al. | 348/598 |
| 2010/0177172 A1 | 7/2010 | Ko et al. | |
| 2010/0177174 A1 | 7/2010 | Ko et al. | |
| 2010/0182407 A1 | 7/2010 | Ko et al. | |
| 2010/0277485 A1 | 11/2010 | Zalewski | |
| 2012/0002025 A1* | 1/2012 | Bedingfield, Sr. | 348/55 |

FOREIGN PATENT DOCUMENTS

| | | |
|---|---|---|
| WO | WO 2007/117485 | 10/2007 |
| WO | WO 2011/008626 | 1/2011 |

OTHER PUBLICATIONS

Buhrmester, Jason, "What You Should Be Playing Right Now." Playboy Magazine, Nov. 2010, p. 24.
Eisenberg, Anne, "Did a Speeding Car Just Jump Out of My Cellphone?" The New York Times, Jul. 3, 2010, accessed online http://www.nytimes.com/2010/07/04/technology/04novel.html?scp=2&sq=anne%20eisenberg&st=cse 3 pages.
Good, Owen, "Sony Explores Alternative to Split-Screen Multiplayer." Jul. 19, 2010, accessed online http://m.kotaku.com/5591140/sony-patents-alternative-to-split+screen-multiplayer 1 page.
U.S. Appl. No. 60/788,663, filed Apr. 3, 2006, 24 pages.
U.S. Appl. No. 61/225,533, filed Jul. 14, 2009, 42 pages.

* cited by examiner

*Primary Examiner* — William C Vaughn, Jr.
*Assistant Examiner* — Naod Belai
(74) *Attorney, Agent, or Firm* — Kilpatrick Townsend & Stockton LLP

(57) ABSTRACT

An apparatus includes a user wearable viewing device for assisting the user to view a representation of three dimensional content. The user wearable viewing device is assigned a unique identifier to provide a private viewing experience for the user.

27 Claims, 18 Drawing Sheets

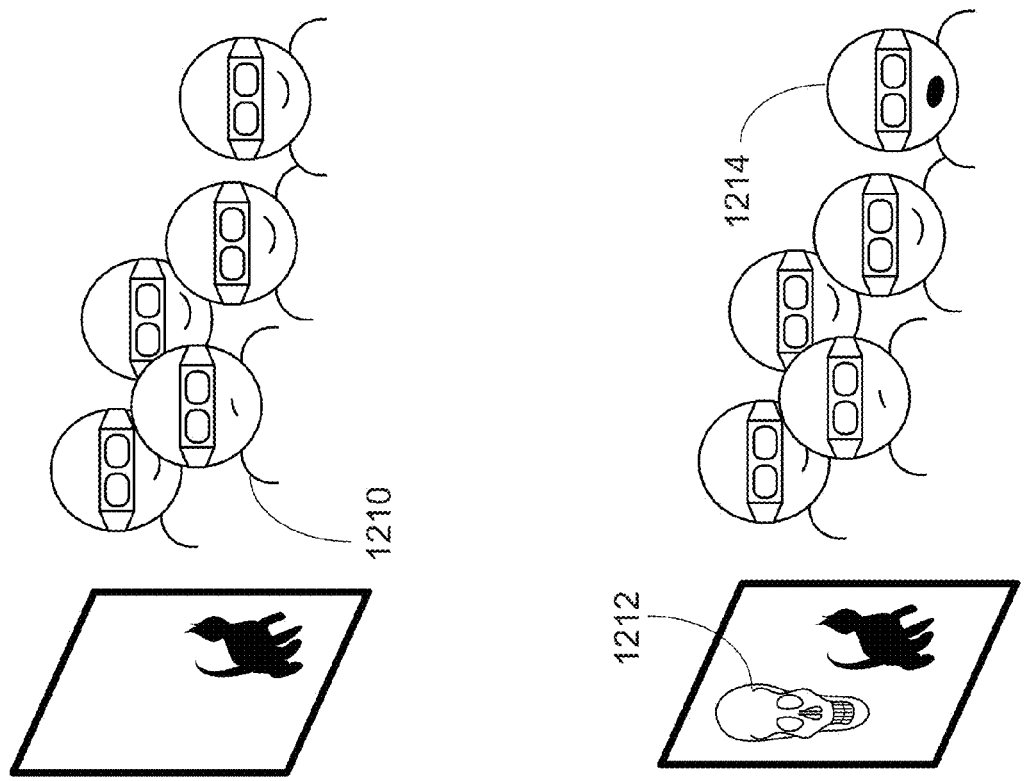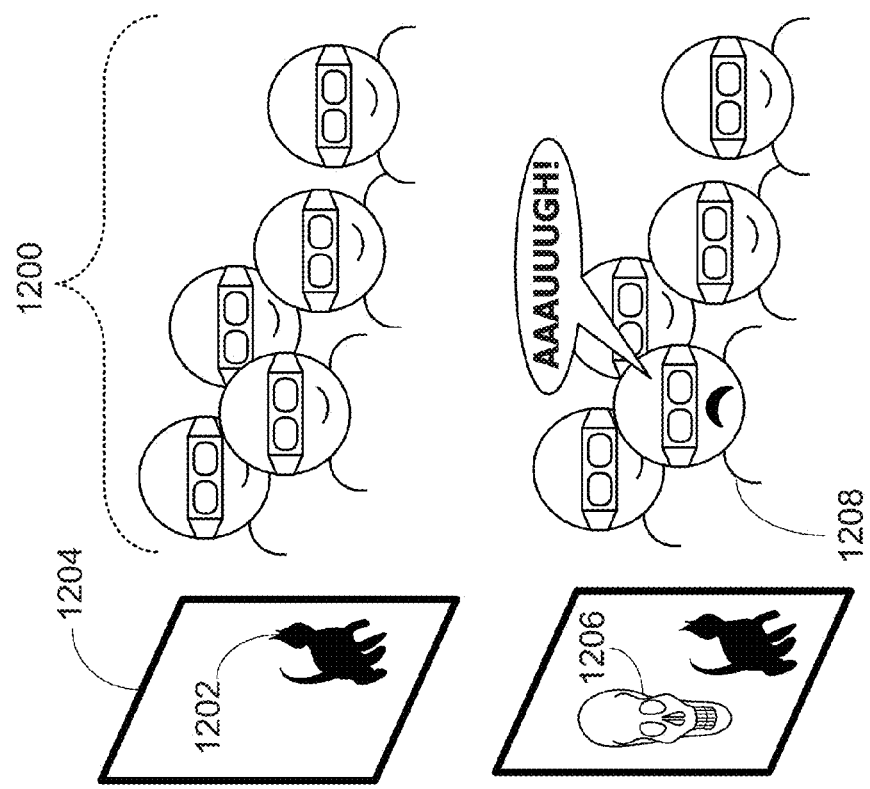
FIG. 12

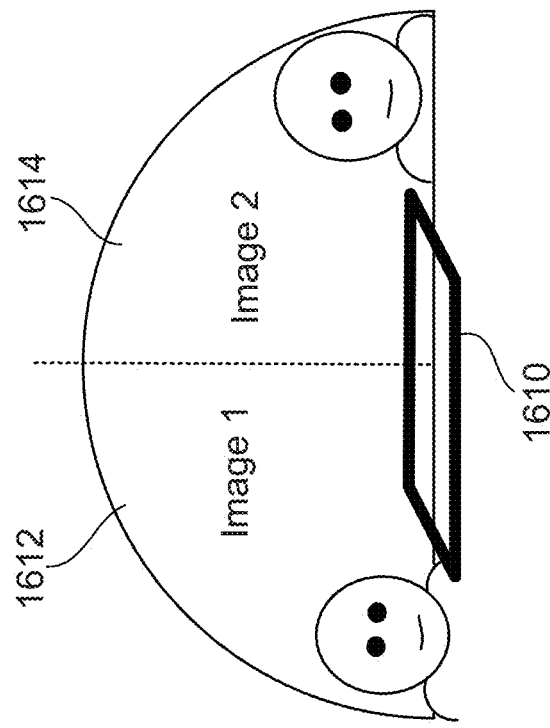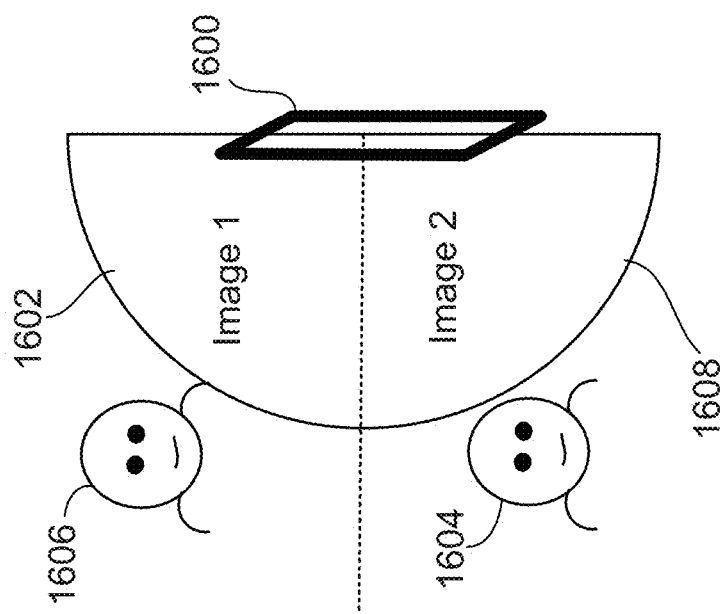
FIG. 16

USER WEARABLE VIEWING DEVICES

CLAIM OF PRIORITY

This application claims priority under 35 USC §119(e) to U.S. Patent Application Ser. No. 61/361,881, filed on Jul. 6, 2010, the entire contents of which are hereby incorporated by reference.

TECHNICAL FIELD

This document relates to user wearable viewing devices for presenting different types of content from a single display.

BACKGROUND

Similar to motion picture theater screens, televisions and other types of displays are capable of providing visual content to multiple viewers. For example, relatively large televisions (e.g., fifty inch diagonal, one hundred inch, etc.) may be viewed by many for an enjoyable joint viewing experience. Also similar to motion picture theater screens, such displays may also provide multi-dimensional content. High resolution two-dimensional content (e.g., high definition broadcast, recorded high definition titles, etc.) may be presented. Three-dimensional content may also be displayed on large television displays by using one or more techniques. By presenting stereoscopic imagery (e.g., left eye and right eye images) from different perspectives, a viewer can visually combine the presented imagery to simulate depth perception. Viewed by more than one person, such a joint viewing experience can present stereo three-dimensional content to multiple viewers.

SUMMARY

The described systems and techniques are for presenting visual information associated with various applications to observers. A user wearable viewing device such as a pair of viewing glasses is assigned a unique identifier. By using the unique identifier, three dimensional content (e.g., imagery, graphics, etc.), two dimensional content (e.g., text, graphics, images, etc.), etc. may be presented in a private view to the individual wearer or in a shared view (with other observers). Various applications may be enhanced by providing such shared and private views. For example, video game titles, motion pictures and similar types of visual content may be enhanced for viewing by the individual. By providing both shared and private views, specific visual content may be presented to the individual in a targeted manner while other visual content is jointly enjoyed by the individual and other observers.

In one aspect, an apparatus includes a user wearable viewing device for assisting the user to view a representation of three dimensional content. The user wearable viewing device is assigned a unique identifier to provide a private viewing experience for the user.

Implementations may include any or all of the following features. The private viewing experience may include at least one of three dimensional content, two dimensional content and a combination of three dimensional content and two dimensional content. The assigned unique identifier may provide a shared viewing experience for the user with one or more other users. The shared viewing experience may include at least one of three dimensional content, two dimensional content and a combination of three dimensional content and two dimensional content. The assigned unique identifier may allow the viewing device to visually isolate the user. The unique identifier may include a numerical value uniquely assigned to the user wearable viewing device. The user wearable viewing device may include a left eye lens and a right eye lens. Another unique identifier may be assigned to the left eye lens for controlling operations of the left eye lens. Another unique identifier may be assigned to the right eye lens for controlling operations of the right eye lens.

In another aspect, a computer-implemented method includes assigning a unique identifier to a user wearable viewing device that assists the user in viewing a representation of three dimensional content. The assigned unique identifier is capable of being used to provide a private viewing experience for the user.

Implementations may include any or all of the following features. The private viewing experience may include at least one of three dimensional content, two dimensional content and a combination of three dimensional content and two dimensional content. The assigned unique identifier may provide a shared viewing experience for the user with one or more other users. The shared viewing experience may include at least one of three dimensional content, two dimensional content and a combination of three dimensional content and two dimensional content. The assigned unique identifier may allow the viewing device to visually isolate the user. The unique identifier may include a numerical value uniquely assigned to the user wearable viewing device. The user wearable viewing device may include a left eye lens and a right eye lens. Another unique identifier may be assigned to the left eye lens for controlling operations of the left eye lens. Another unique identifier may be assigned to the right eye lens for controlling operations of the right eye lens.

In another aspect, a computer program product tangibly embodied in an information carrier and comprising instructions that when executed by a processor perform a method that includes assigning a unique identifier to a user wearable viewing device that assists the user in viewing a representation of three dimensional content. The assigned unique identifier is capable of being used to provide a private viewing experience for the user.

Implementations may include any or all of the following features. The private viewing experience may include at least one of three dimensional content, two dimensional content and a combination of three dimensional content and two dimensional content. The assigned unique identifier may provide a shared viewing experience for the user with one or more other users. The shared viewing experience may include at least one of three dimensional content, two dimensional content and a combination of three dimensional content and two dimensional content. The assigned unique identifier may allow the viewing device to visually isolate the user. The unique identifier may include a numerical value uniquely assigned to the user wearable viewing device. The user wearable viewing device may include a left eye lens and a right eye lens. Another unique identifier may be assigned to the left eye lens for controlling operations of the left eye lens. Another unique identifier may be assigned to the right eye lens for controlling operations of the right eye lens.

Details of one or more implementations are set forth in the accompanying drawings and the description below. Other features, aspects and advantages will be apparent from the description and drawings, and from the claims.

DESCRIPTION OF DRAWINGS

FIGS. 11-16 illustrate techniques for presenting shared and private views on a single display.

DETAILED DESCRIPTION

Figure 1:
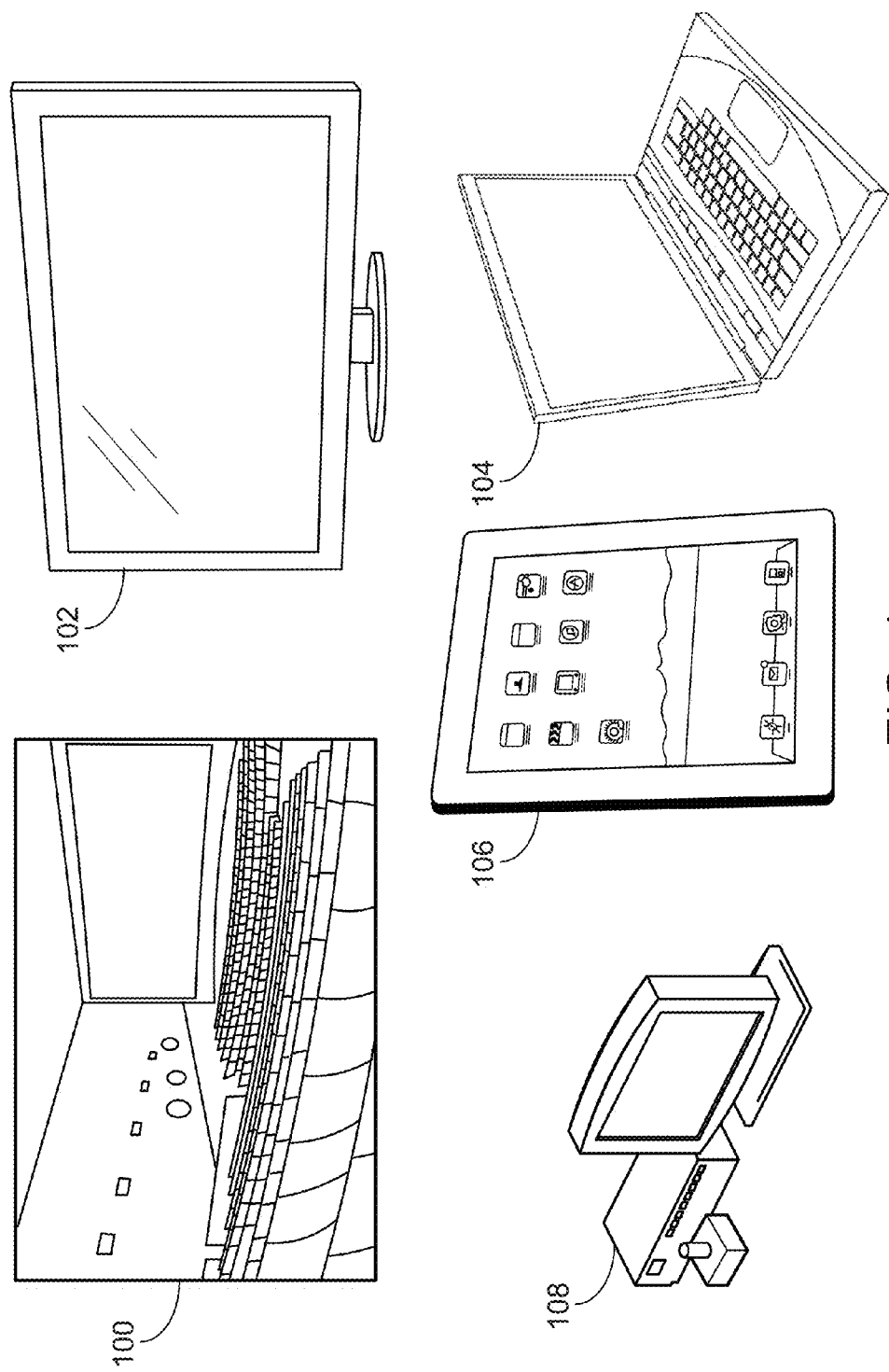
FIG. 1 illustrates various environments and devices for presenting visual content on a single display to multiple viewers.

Referring to FIG. 1, with the increased use and development of applications that include three-dimensional (3D) content, more and more platforms are being developed (or modified) for presenting such content. For years, movie theaters have served as a venue for presenting 3D content in motion pictures of various genres to provide a group of viewers with a shared experience that includes simulated depth perception. With the development of different systems for viewing motion pictures and other types of content (e.g., broadcast programming), interest in presenting 3D content with these systems has correspondingly increased. For example, similar to presenting 3D motion pictures in a movie theater 100, various types of televisions 102 have been developed for presenting such content. Devices and systems that may be considered more user-interactive may also be capable of presenting 3D content. For example, computing devices may include one or more types of technology for displaying such content. Computer systems (e.g., a laptop computer 104, a tablet computing device 106, etc.), cellular telephones (e.g., smart phones, etc.) and other types of computing devices may be capable of presenting such content. Along with content produced offline such as motion pictures (e.g., provided by a digital video disk, received from a network such as the Internet, etc.), 3D content may also be provided for presentation from applications that may be considered online. In general, an online application can be considered as producing content during operation. For example, content may be produced in near real time as determined by user interaction or other types of events. In some arrangements, 3D content may be used for presenting virtual environments (e.g., video game titles, environments for social interactions, avatars, etc.). While computing devices such as the laptop computer 104, the tablet computing device 106 and other types (e.g., a smart cellular phone) may be capable of presenting such virtual environments, computing devices specially developed for such applications may also provide the content. For example, a gaming console 108 may be capable of presenting 3D content for such user interactive applications. By establishing communication links (e.g., direct connections, network connections, etc.), televisions (e.g., television 102) and other similar display devices may also be used for presenting 3D content associated with virtual environments or other online applications. Further, while not typically employed to present user interactive virtual environments (such as game play of a video game title), scenarios may occur in which 3D content is presented on the screen of a theater or other type of large display for presenting to a relatively large group of users (e.g., a display at a sporting venue). In general, 3D content can be considered as type of content (e.g., imagery) that provides the illusion of depth. One or more techniques may be implemented for providing such content. For example, 3D imagery may be visually perceived (by an observer) by presenting two slightly different views of a scene (e.g., stereo 3D). The content produced by such techniques is referred to as 3D content or 3D imagery. Content that does not provide the illusion of depth to an observer (e.g., a non-stereo 3D image, two-dimensional (2D) imagery) is referred to as 2D content or 2D imagery.

By presenting such 3D content on such displays, a group of viewers can share a similar if not nearly the same (or exactly the same) visual experience. For example, a large group of people seated in the theater 100 may commonly experience the simulated depth perception provided by a 3D motion picture. Similarly, a smaller group of individuals may share the viewing experience of a 3D game title by watching the television 102 or a display in communication with the game console 108. While computing devices such as the laptop computer 104 and the tablet computing device 106 are typically viewed by an individual (e.g., a sole user), content from such devices may also be viewed by a group of individuals. For example, along with a small group viewing the display of the laptop computer 104 and the tablet computing device 106, groups of individuals may view the content from these devices as presented on a connected display (e.g., the television 102).

Often multiple viewers (e.g., players) interact with online applications such as a video game title as a virtual environment is presented on a single display. For example, two (or more) players may be viewing a single display (e.g., the television 102) during game play. Typically, both players may be able to view the same content (e.g., the same view of the virtual environment of the game). In some arrangements, a split screen is presented to both players so that each may focus on an assigned display region (e.g., left side of the display, right side of the display, upper or lower portion of the display, etc.) that presents a corresponding portion of a virtual environment. However, even though the display is split, both players can view the display region assigned to the other player (who may be an opponent). As such, each player may be unable to plan and execute game moves (dependent upon game title) without being observed by the other player. Further, for some game titles (or other types of virtual environments), information may need to be confidentially provided to one player (e.g., a textual message presented to the player). However, since all content is being presented on a single display, such confidential information may be difficult to receive absent an opposing player also viewing the information. In addition to hindering privacy, such split screens do not provide a player with full use of a screen.

Figure 2:
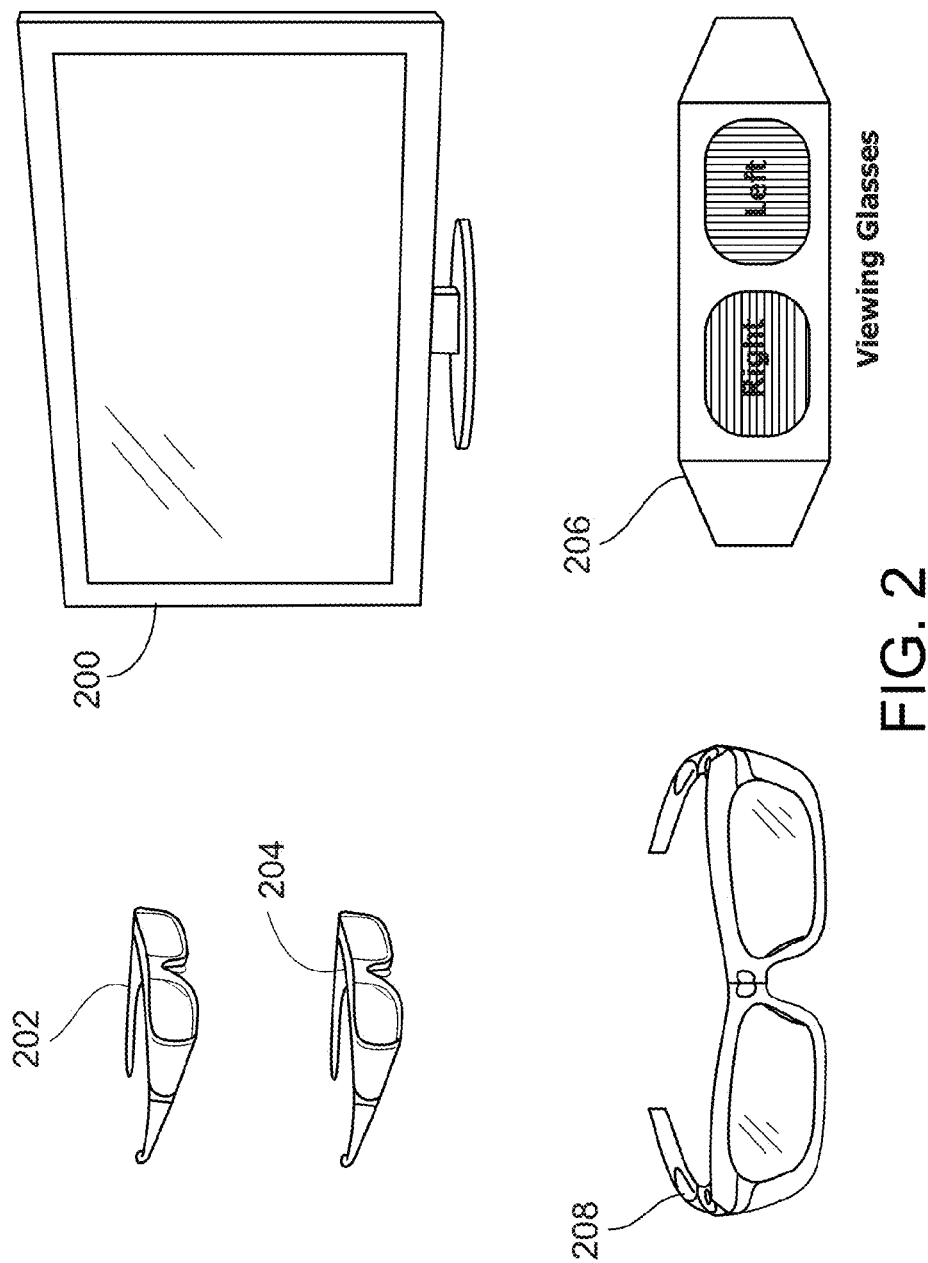
FIG. 2 illustrates a system for presenting representations of three dimensional content on a single display to multiple viewers.

Referring to FIG. 2, for offline applications (e.g., motion pictures) and online applications (e.g., video game titles) alike, one or more techniques and methodologies may be implemented to produce 3D content for presentation on a display. For example, different techniques may be used to produce multiple images (e.g., stereoscopic images) for separate left eye views and right eye views that may be visually combined by a viewer to perceive depth in the imagery. By simultaneously presenting images of left and right eye views, depth may be simulated by using various separation techniques such as color filters, polarizing filters, time-based shutters, etc. In the illustrated example, two-dimensional (2D) stereoscopic images of a 3D scene may be presented on a television 200. To provide depth perception for the viewer or viewers (and simulate the 3D scene), the stereoscopic images include two different views of the scene (e.g., one view from a right eye perspective and another view from a left eye perspective). In this arrangement, visually combining slight spatial differences between the two views provides the simulated depth perceived by the observer(s). In general, when viewing such multiple views of a 3D scene, the visual information observed by each eye is independently perceived and binocular vision is established to provide 3D depth perception for the viewer. As mentioned, along with filtering techniques (e.g., color filters, polarizing filters, etc.), separation techniques also include using time-base shutters in which as one perspective view (e.g., left eye view) is presented to the appropriate eye of the observer while the view of the opposite eye (e.g., the right eye) is blocked. For the next image, the perspective view is presented to the previously blocked eye (e.g., the right eye) while the eye presented the earlier view (e.g., the left eye) is blocked. Based upon slight differences of the two images (e.g., spatial positions of objects), the visual system of the observer creates an illusion of seeing the imagery in 3D space.

As illustrated in the figure, wearable viewing devices present observers with the alternating left and right eye views presented by the television 200. Synchronized with the presentation of the provided views, each lens (e.g., left eye lens) can become transparent to allow a corresponding image (e.g., for the left eye) to be received and can become opaque to block an image to be receipted by the opposing eye (e.g., the right eye). For the next image, which is to be received by the opposing eye (e.g., the right eye), the transparency of opaqueness of the lens reverse (e.g., the left eye lens becomes opaque and the right eye lens becomes transparent). As such, the observer visually combines the alternating imagery and perceives depth. In this particular arrangement, the wearable viewing devices are two pairs of glasses 202, 204 that included appropriately controllable lenses (e.g., to alternate the individual lenses between transparent and opaque states) and associated equipment for controlling the lenses. For example, each pair of glasses 202, 204 may include one or more sensors (and associated circuitry, processor instructions, etc.) for receiving one or more control signals from the television 200 (or associated equipment such as a controller) that initiate a state change for the lenses (e.g., from the transparent state and the opaque state and vice versa). As such, by each wearing one of the pairs of glasses 202, 204, the observers are able to view the 3D content presented on the single display of the television 200. For subsequent figures, the wearable viewing devices are represented by a less detailed line drawing 206 compared to the details presented for the pairs of glasses 202, 204 and for another pair of glasses 208 that is presented for a side-by-side comparison of with the line drawing. Similar to the illustrated pair of glasses 208, the viewing device 206 includes individually controllable lenses (e.g., that alternate between transparent and opaque states) to providing left and right views to an observer.

Figure 3:
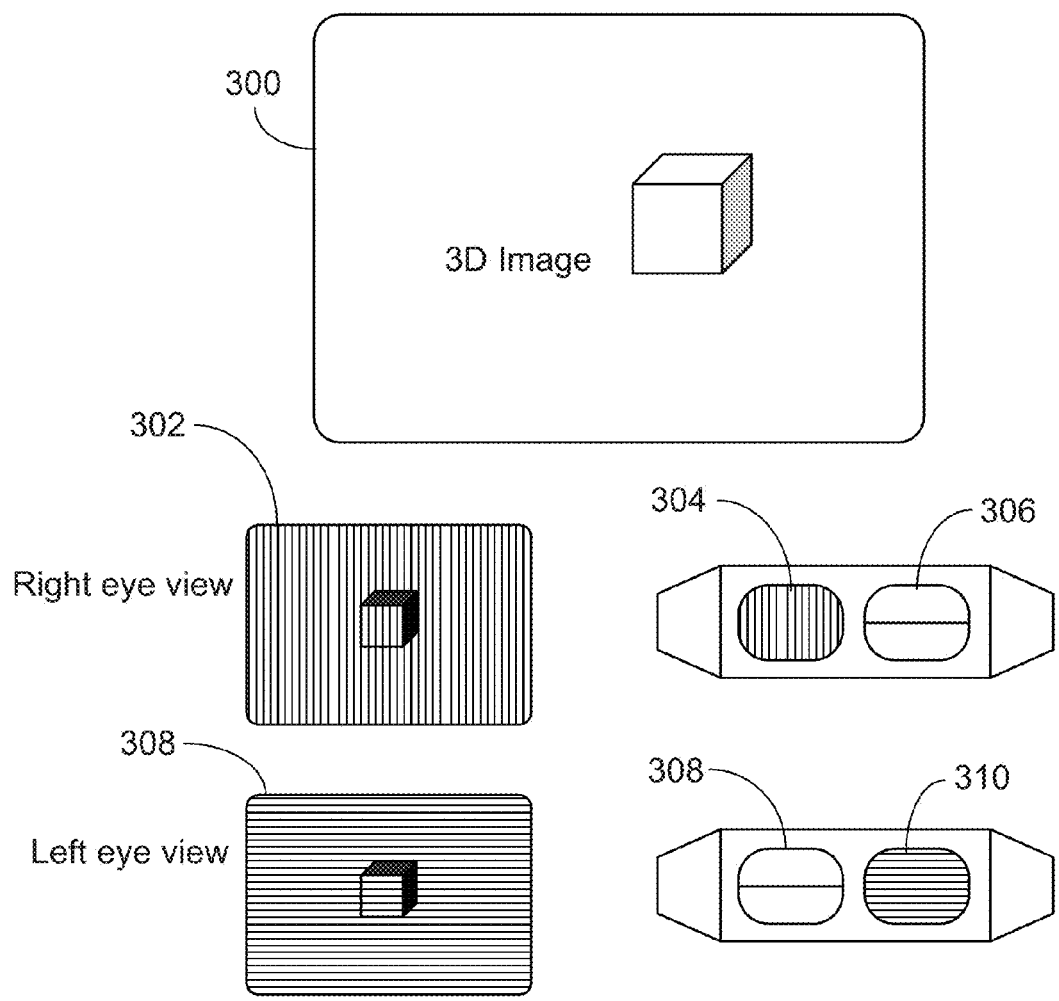
FIGS. 3, 4, 5 and 6 illustrate techniques for presenting representations of three dimensional or two dimensional content.

Referring to FIG. 3, a graphical representation is provided that illustrates the alternating between transparent and opaque states to provide 3D content 300 (e.g., a 3D box) to the observers respectively wearing viewing devices (e.g., one wearing the pair of glasses 202 and the other wearing the glasses 204, both shown in FIG. 2). As illustrated with one pair of viewing devices, upon being presented a right eye view 302 (e.g., by the television 200, also shown in FIG. 2), a right eye lens is placed into a transparent state (as represented with the vertical lines 304) while the a left eye lens is placed into an opaque state (as represented with the single, bold horizontal line 306) such that the observer's left eye does not receive the view 302 that is transmitted for the right eye. Next, viewing is reversed to present a corresponding stereoscopic image 308 to the left eye of the observer. As illustrated in the figure, the right eye lens is placed into an opaque state (as represented by the single, bold horizontal line 308) while the left eye lens is placed into a transparent state (as represented by the series of horizontal lines 310). By providing these component images to the corresponding eyes of a viewer, the 3D image 300 may be perceived by the viewer. Similarly, other viewing devices (e.g., glasses) would also provide the 3D image 300 to other observers (e.g., based upon executing the control operations from the television to set the state of each viewing device lens). As such, the 3D image 300 would be shared among the observers.

Figure 4:
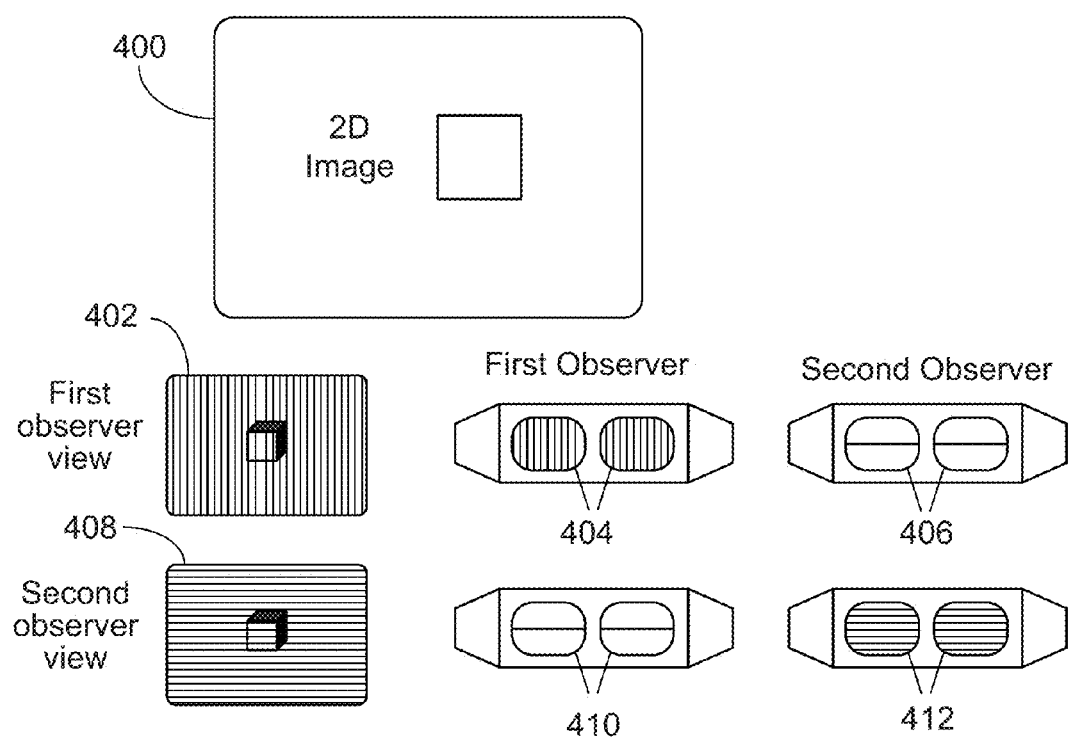

Referring to FIG. 4, while the presentation of the 3D imagery shown in FIG. 3 may be provided as a shared viewing experience to multiple observers (each wearing a pair of viewing devices), the illustrated technique in this figure provides a technique for presenting private views of imagery. For example, one 2D image may be presented to one observer while another 2D image may be presented to a different observer. As such, each observer receives a private view, which could be considered as a personalized view, while another observer is isolated from receiving the same view. Upon the second observer being provided a private view of an image, the first observer is similarly isolated from receiving the private image (intended for the second observer). As such, presented content may be steered to one (or more observers) and isolated from one or more other observers. In the illustrated example, a 2D image 400 is separately presented to two different viewers. After the image 400 is privately presented to the first observer at one time instance, the image is then privately presented to the second observer. To provide a first view 402, both lenses of the viewing device worn by the first observer are placed into a transparent state (as represented by the vertical lines 404 in each lens) and both lenses of the viewing device worn by the second observer are placed into an opaque state (as represented by the single, bold horizontal line 406 in each lens). As such, the image included in the first view 402 is privately viewed by the first observer and the second observer is isolated from the image. Upon a second view 408 being presented (e.g., by the television 200), the state of the viewing devices reverse. For example, both lenses of the viewing device being worn by the first observer are placed into an opaque state (as represented by the single, bold horizontal line 410) and both lenses of the viewing device worn by the second observer are placed into a transparent state (as represented by the horizontal lines 412). Thereby, 2D content may be presented to one observer and prevented from being viewed by another observer.

To selectively provide content to one observer while blocking the content to another observer (or multiple observers), one or more techniques may be implemented. For example, by uniquely identifying each pair of viewing devices, controlling operations (as provided by control signals from the television 200, a computer system, a game console, etc.) may be directed to one or more specific viewing devices. Control signals may also be provided from a device that is separate from the content presenting device. For example, a computing device may provide control signals to both the pair (or pairs) of viewing devices and the content presenting device (e.g., the television 200). In one arrangement, a unique identifier may be assigned to each pair of viewing devices. For example, a unique collection of alpha-numerical characters (e.g., a unique sting of numbers and/or letters, etc.) may be assigned to each viewing device. As such, by using the assigned identifier (e.g., in a control signal transmitted from the television 200), the viewing device may be directed to provide a private view (e.g., place lenses into a transparent state) or isolate the viewer (e.g., place lenses into an opaque state). Further, in some arrangements, each lens of a viewing device may be assigned a unique identifier to uniquely control the operation of each lens. For example, similar to the viewing devices, a unique collection of alpha-numerical characters may be assigned to each lens. Other similar techniques may also be implemented to uniquely identify (and control) each viewing device and/or each lens included in each viewing device. For example, to control the action of each lenses of a viewing device (e.g., a pair of glasses), a unique identifier may be assigned to the viewing device (for being identified by a transmitted signal) and the operations of each of the lenses may be controlled by command signals (e.g., two-bit commands) included in the transmitted signal or another signal.

Figure 5:
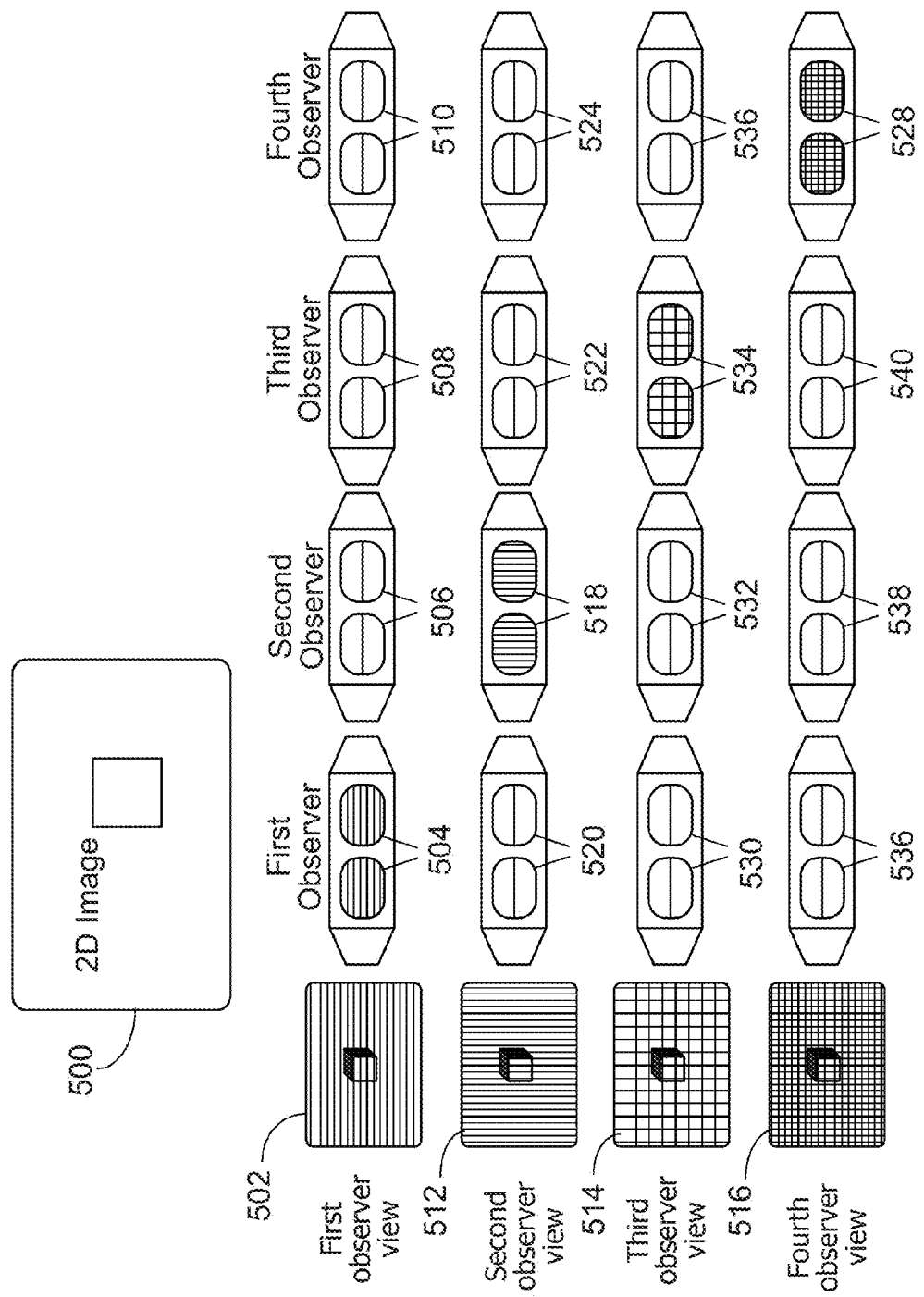

Referring to FIG. 5, similar to providing private views of content (e.g., 2D content) to two observers, the number of private views may be expanded to providing private views for additional observers. As shown in this illustration, private views of a 2D image are provided to four observers. In this arrangement, as a corresponding private view is provided to one of the four observers, the remaining three observers are visually isolated. For example, a control signal (transmitted by the television 200) may include the unique identifier assigned to the viewing device for appropriately providing the presented content to an observer. Since the remaining three viewing devices (e.g., being worn by the other three observers) have not been assigned the unique identifier, the three remaining devices may be placed in a mode to isolate these observers from viewing the presented content. In this example, a 2D image 500 is to be privately presented to each of the four observers as the other three corresponding observers are isolated from the private view. As such, a first view 502 for the first observer is presented by placing both lenses (of a viewing device being worn by the first observer) into a transparent state. To provide this functionality, the unique identifier included in a control signal (e.g., transmitted from the television 200 as the 2D image 500 is presented) may match the identifier assigned to the viewing device of the first observer. Upon detecting the identifier match, the viewing device may execute one or more operations initiated by the received control signal (e.g., to place both lens in a transparent state, as represented by vertical lines 504). Alternatively, since the remaining three viewing devices have not been assigned a matching unique identifier (as the identifier included in the received control signal), each of these three viewing devices may be placed into a closed state (e.g., to place the corresponding lens of each device into an opaque state, as represented by the respective single, bold, horizontal lines 506, 508, 510). In a similar manner, respectively, 2D images (e.g., 2D image 512, 514 and 516) may be correspondingly presented to an appropriate observer (e.g., the second, third or fourth observer). For example, based upon a unique identifier being transmitted (e.g., by the television 200) as the 2D image 512 is presented, the lenses of the viewing device worn by the second observer may be placed into a transparent state (as represented by horizontal lines 518) while the other observers are visually isolated (e.g., as represented by the respective single, bold, horizontal lines 520, 522, 524). Similar events hold for the third and fourth observers when respective 2D images 514, 516 are presented. For example, the third and fourth observers may be provided respective private views (as represented by hashed lines 526 and pattern 528) while the other observers are correspondingly isolated (as respectively represented by single, bold horizontal lines 530, 532 534, and, single, bold horizontal lines 536, 538, 540). As such, similar to providing two observers private views, the technique may be expanded for providing private views for more observers.

Figure 6:
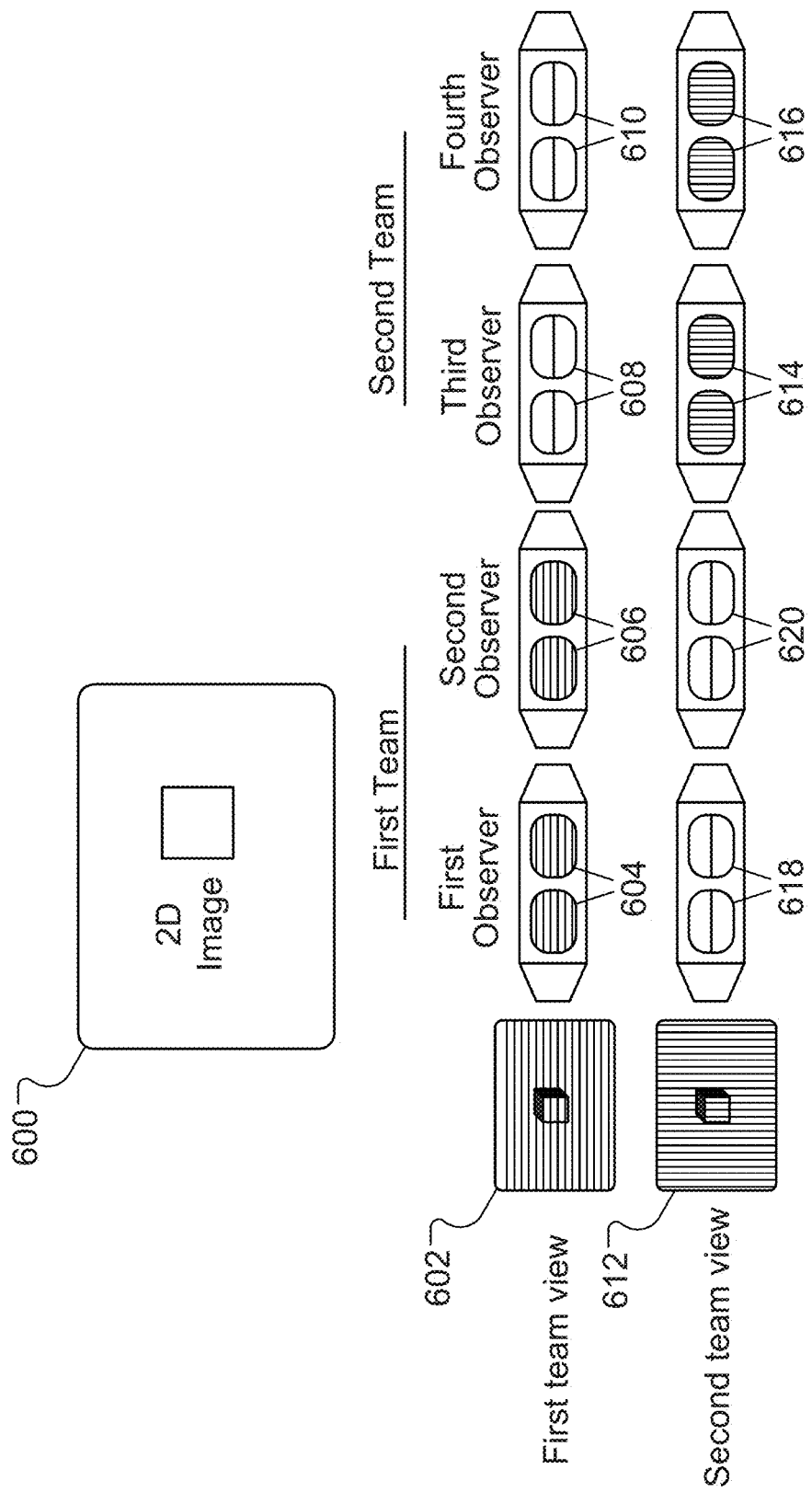

Referring to FIG. 6, along with presenting private views to individuals, private views may be presented to groups of associated observers. For example, for virtual environment applications such as video game titles, one or more teams of players may be formed. In order to function as a cohesive unit, each team member may need to view confidential content related to other team members or the team as a whole. As such, assigned team members may be presented views associated with the assigned team while other players or other entire teams may be isolated from this view. In the illustrated example, two teams are defined as each having two members. Similar to the example presented in FIG. 5, 2D image content 600 is being presented. In particular as a 2D image 602 is presented to a first team (that includes a first and second observer), members of a second team (that include a third and fourth observer) are isolated. As represented in the image, when 2D image 602 is presented (on the television 200), the lenses of the viewing devices for the first and second observer are placed into a transparent state (as represented by the vertical lines 604, 606) and the lenses of the viewing devices for the third and fourth observers of the second team are placed into an opaque state (as represented by the single, bold horizontal lines 608, 610). Similarly, when a 2D image 612 is presented to the viewing devices of the second team (as represented by the horizontal lines 614, 616 for the third and fourth observers), the lenses of the viewing devices for the members of the first team are placed into an opaque state (as represented by the single, bold horizontal lines 618, 620). As such, private views may be provided to multiple observers (e.g., included in a common team) but also blocked from being presented to other observers (e.g., included in an opposing team).

One or more techniques may be implemented to define teams such that views are appropriately provided to team members and isolated from opposing teams and non-team members. For example, by assigning a unique identifier to each viewing device, groups of the identifiers may be defined as signifying membership in a team. As such, control signals (e.g., transmitted as a corresponding view is presented) may provide data that identifies the appropriate team or individual team members (as provided by the assigned unique identifiers) for receiving the presented private view. By including assigned unique identifiers for other teams and/or other team members, one or more private views may be provided to an opposing team.

Figure 7:
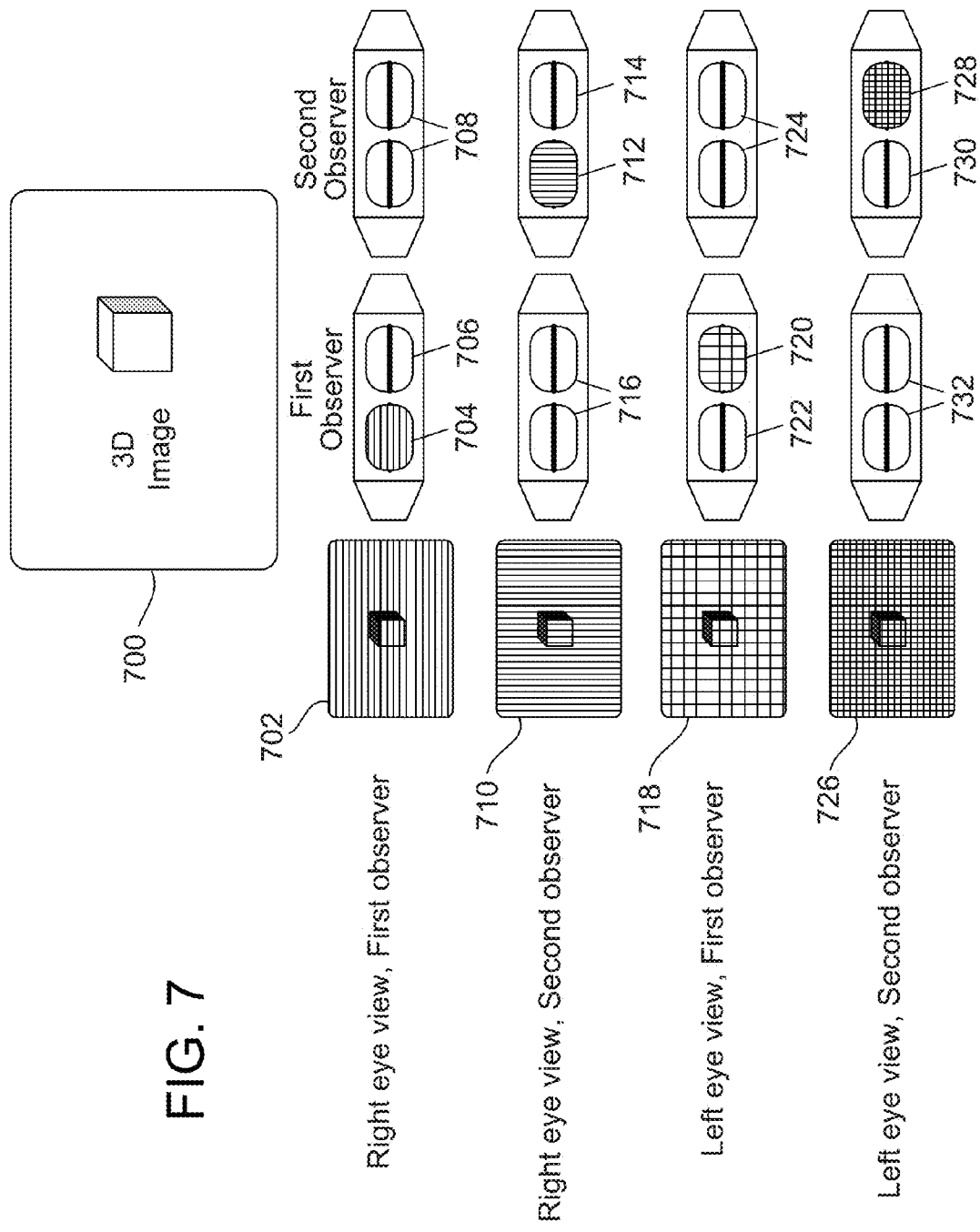
FIGS. 7, 8 and 9 illustrate a technique for presenting shared and private views on a single display.

Referring to FIG. 7, similar to presenting private views of 2D images, other types of image content may also be presented for one observer (e.g., game player) or a subset of observers. For example, 3D images may be presented as a private view to one or more observers. As illustrated in the figure, 3D imagery 700 may be presented in a private view by presenting an observer with a left eye perspective view at one instance (while the right eye of the observer is obstructed) and a right eye perspective view at another instance (while the left eye of the observer is obstructed). Similarly, a private view may be provided to another observer, who was visually isolated as the private view was presented to the first observer.

In this particular illustration, a 3D image 700 is presented to a first observer (while a second observer is visually isolated) and another 3D image is presented to the second observer (while the first observer is visually isolated), which may or may not be the same image presented to the first observer. To initiate the presentation of the two private views, a right eye view 702 is presented to the right eye of the first observer by placing the right lens of the viewing device in a transparent state (as represented by vertical lines 704) while the left eye of the first observer is obscured by placing the left lens of the viewing device in an opaque state (as represented by the single, bold horizontal line 706). Both lenses of the viewing device of the second observer are placed into an opaque state to visually isolate the second observer (as represented by the single, bold horizontal lines 708). During the next time instance, a portion of the private view for the second observer may be presented on the single display (e.g., the television 200). In this example, a right eye view 710 is presented to the right eye of the second observer by placing the right lens of the viewing device in a transparent state (as represented by horizontal lines 712) while the left eye of the second observer is obscured by placing the left lens of the viewing device in an opaque state (as represented by the single, bold horizontal line 714). Similarly, both lenses of the viewing device of the first observer are placed into an opaque state to visually isolate the first observer (as represented by the single, bold horizontal lines 716). Next, to provide the complementary view to the first observer, a left eye view 718 is presented to the left eye of the first observer by placing the left lens of the viewing device in a transparent state (as represented by hashed lines 720) while the right eye of the first observer is obscured by placing the right lens of the viewing device in an opaque state (as represented by the single, bold horizontal line 722). Similarly, both lenses of the viewing device of the second observer are placed into an opaque state to visually isolate the second observer (as represented by the single, bold horizontal lines 724). In a similar manner, to provide the complementary view to the second observer, a left eye view 726 is presented to the left eye of the second observer by placing the left lens of the viewing device in a transparent state (as represented by pattern 728) while the right eye of the first observer is obscured by placing the right lens of the viewing device in an opaque state (as represented by the single, bold horizontal line 730). Both lenses of the viewing device of the first observer are placed into an opaque state to visually isolate the first observer (as represented by the single, bold horizontal lines 732). As such, similar to providing 2D images privately to one observer, 3D imagery may also be privately provide to an observer. With reference to presenting 2D images in private views to groups of individuals (e.g., teams) as shown in FIG. 6, 3D images may similarly be presented in private views to groups of two or more individuals (e.g., members assigned to a team).

One or more techniques may be implemented for presenting individual left eye and right eye views to provide private views. For example, similar to assigning a unique identifier to a viewing device for controlling operations associated with the device, identifiers assigned to individual lenses of a viewing device may be utilized. For example, each lens included in a pair of viewing glasses may be assigned a unique identifier. A collection of characters that includes alpha-numerical characters, glyphs or other types of graphical elements may be used for assigning a unique identifier. Once assigned, the identifier may be used for controlling operations associated with an individual lens. For example, an identifier may be represented in a control signal from a display device (e.g., the television 200) such that upon receipt by the pair of glasses (within which the lens is included), the individual lens may be placed into a transparent state (for viewing a private view) or an opaque state (for obstructing the view of an observer wearing the pair of glasses).

Figure 8:
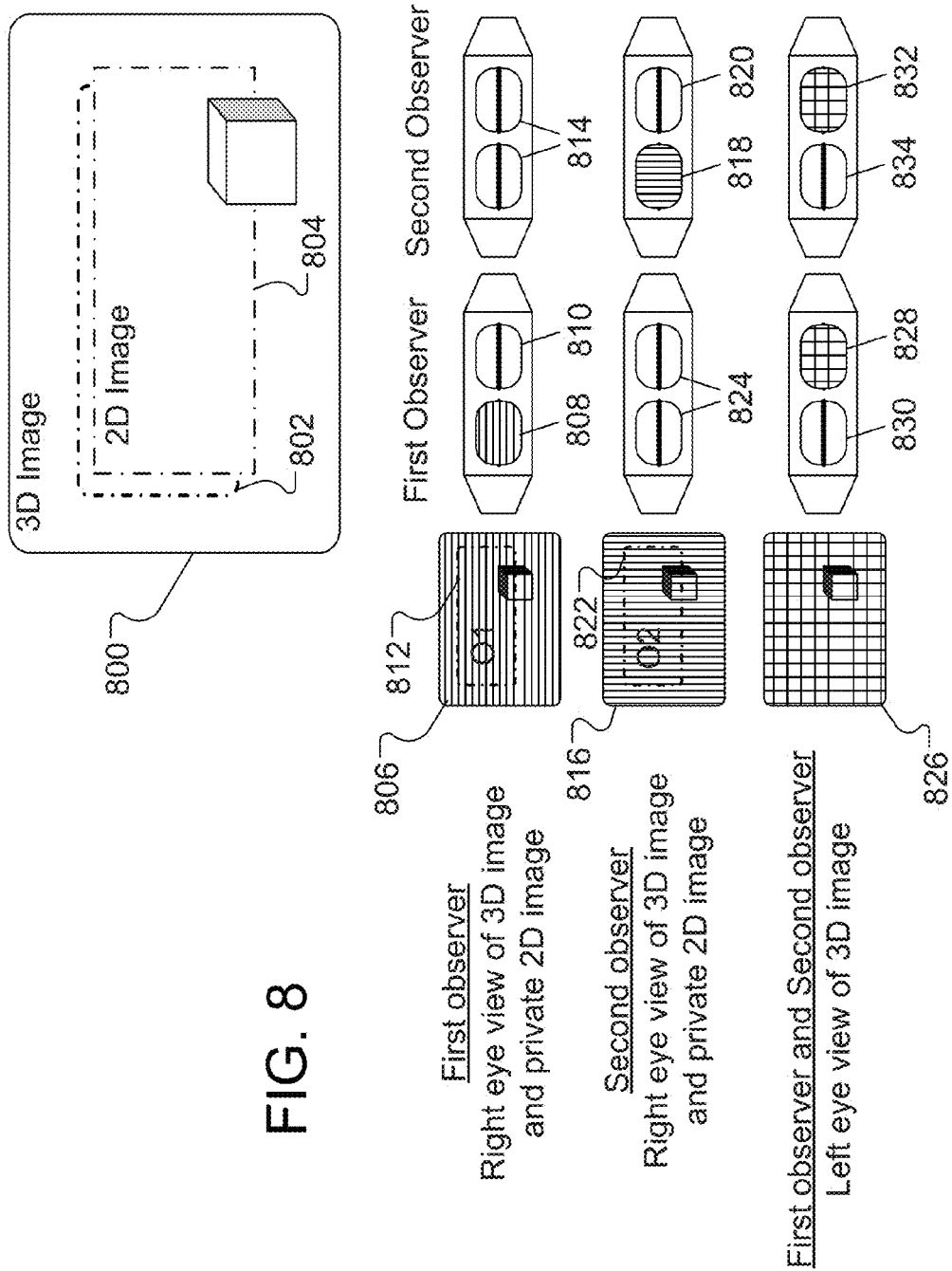

Referring to FIG. 8, in some arrangements multiple types of imagery are presented to observers. For example, 3D imagery (e.g., a scene of a virtual environment) may be presented to the observers in a shared manner and 2D imagery (e.g., confidential information) may need to be privately presented to one or more of the observers. To present all of this imagery, a considerable amount of time may be needed to serially present the imagery during distinct time instances (e.g., at time period one present 3D imagery to a first observer, at time period two present 3D imagery to a second observer, at time period three present 2D imagery to the first observer, at time period four present 2D imagery to the second observer, etc.). As such, for a noticeable amount of time during these time periods, fewer images are actually being presented to each individual observer (as images are presented to the other observer). Further, scenarios in which there are more than two observers (e.g., four, six, eight observers) may further increase the time period between images being presented to each of the observers. As such, the presented imagery to each observer may be perceived as visually flickering (which can become a distraction). Additionally, by presenting fewer images over a period of time, brightness of the images may appear reduced to an observer. As such, by providing the imagery in a serial manner, noticeably for a larger number of observers that are each to receive private images, the viewing experience of one or more of the observers may become degraded.

By presenting images in parallel, less time may be needed to present the imagery. As such visual flicker perceived by an observer may be reduced along with improving overall brightness levels. In one example of providing images in parallel, portions of 3D images may be presented to an observer while also presenting a 2D image. As illustrated in the figure, as a right eye perspective view of a 3D image (to be shared among observers) is presented to one observer, a 2D image to be privately viewed by the observer is simultaneously presented. Such a presentation is also provided to another observer, which may similarly reduce visual flicker of the images and increase image brightness.

In the illustrated example, a 3D image 800 is to be presented to two observers along with a private 2D image for each of the observers (e.g., a 2D image 802 for a first observer and a 2D image 804 for a second observer), which may or may not be the same image. To initiate the presentation, a right eye view 806 of the 3D image 800 is presented to the right eye of the first observer by placing the right lens of the viewing device in a transparent state (as represented by vertical lines 808) and the left lens of the viewing device is placed in an opaque state (as represented by the single, bold horizontal line 810). Simultaneously, along with presenting the right eye view 806 of the 3D image, a private 2D image 812 is also presented (by way of the right lens in the transparent state) to the first observer. To isolate a second observer from the private view, both lens of the viewing device of the second observer are placed into an opaque state (as represented by the single, bold horizontal lines 814). As such, both a portion of a 3D image (to be shared with another observer) is presented along with a 2D image (to be privately viewed by the observer). Next, a similar presentation is provided to the second observer. For example, a right eye view of the 3D image 816 is presented to the right eye of the second observer by placing the right lens of the viewing device in a transparent state (as represented by horizontal lines 818) and the left lens of the viewing device is placed in an opaque state (as represented by the single, bold horizontal line 820). Simultaneously, along with presenting the right eye view 816 of the 3D image (e.g., which may be the right eye view 806 of the 3D image provided to the first observer), a private 2D image 822 is also presented (by way of the right lens in the transparent state) to the second observer. To isolate the first observer from the private view, both lens of the viewing device of the first observer are placed into an opaque state (as represented by the single, bold horizontal lines 824). With the private views provided to both the first and second observers, in this example, a shared view of a left eye view 826 of the 3D image 800 is provided to both observers. In particular, to provide such a shared view, the left lens of the viewing device used by the first observer is placed into a transparent state (as represented by hashed lines 828) while the right lens is placed into an opaque state (as represented by the single, bold horizontal line 830), and, the left lens of the viewing device used by the second observer is also placed into a transparent state (as represented by the hashed lines 832) while the right lens is placed into an opaque state (as represented by the single, bold horizontal line 834). As such, presenting three images provides both a shared 3D image (provided by a left eye view and a right eye view) and two private 2D images (respectively presented to one of two observers). Along with reducing the visual flicker experience by both observers, the brightness of the imagery may noticeably increase. With reference to presenting 2D images in private views to groups of individuals (e.g., teams) as shown in FIG. 6, similar to presenting shared 3D images and private 2D images to two observers, such content may similarly be presented to groups of two or more individuals (e.g., assigned to a team). Additionally, by presented a shared 3D imagery to both observers, computational resources (e.g., processors, memory, execution time, etc.) may be conserved since separate 3D images may not need to be produced for each observer. Such conserved resources may be applied to other operations (e.g., producing higher quality imagery).

Figure 9:
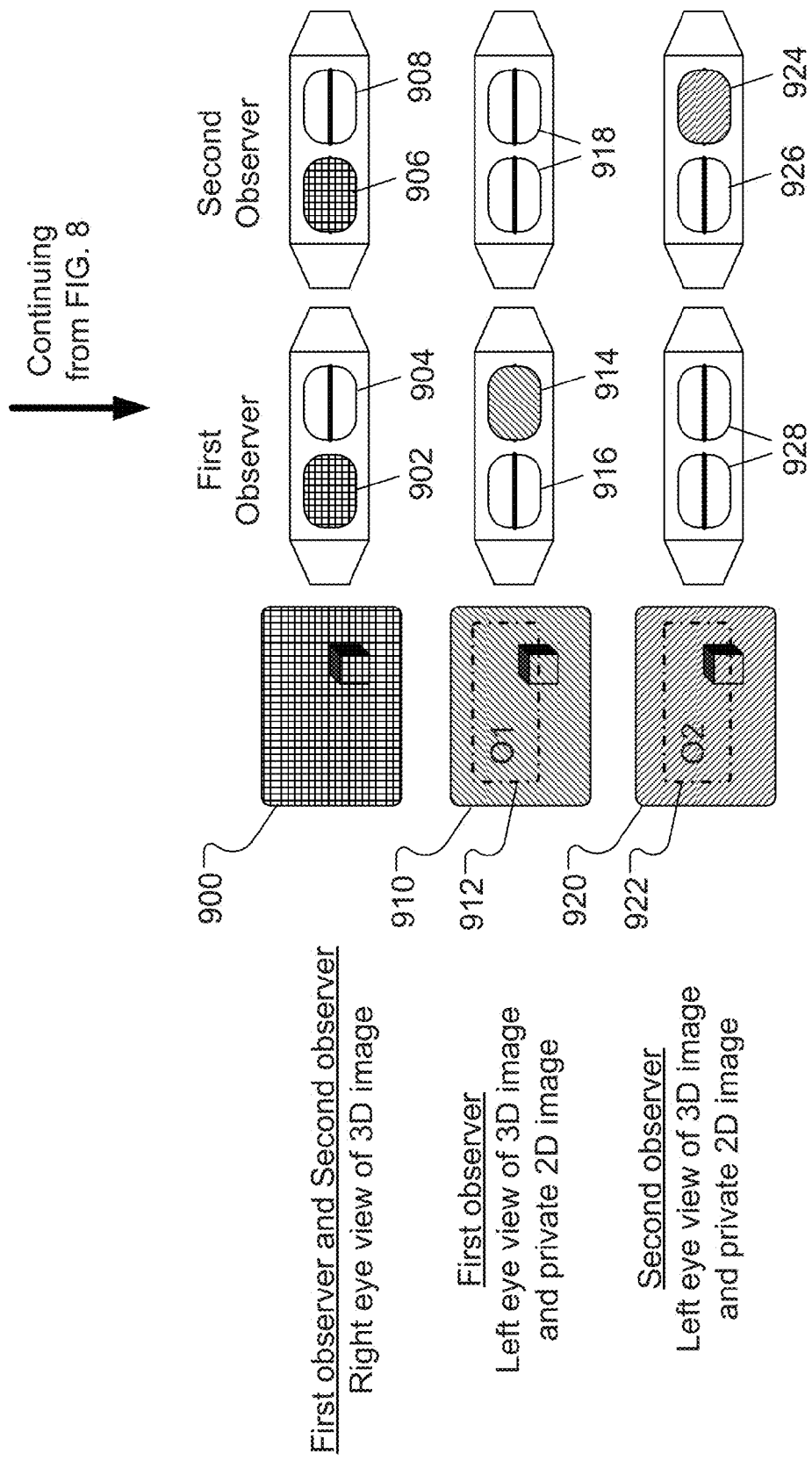

Referring to FIG. 9, various types of techniques may be implemented for presenting 3D and 2D imagery in parallel to reduced presentation cycles and thereby reduce visual flicker experienced by the observers and increase image brightness. For example, rather than just presenting 2D imagery in one eye view (such as the right eye as illustrated in the technique described with FIG. 8), the 2D imagery may be presented in an alternating manner. As such, the 2D imagery may be perceived by both eyes of the observer along with the brightness improvements and visual flicker reductions.

Continuing with the previous example, after the shared left eye view 826 is shown to both observers (as shown in FIG. 8), a shared view right eye view 900 of the 3D image is provided to both observers. To provide the shared view, the right lens of the viewing device used by the first observer is placed into a transparent state (as represented by a tightly packed pattern 902) while the left lens is placed into an opaque state (as represented by the single, bold horizontal line 904), and, the right lens of the viewing device used by the second observer is also placed into a transparent state (as represented by the tightly packed pattern 906) while the left lens is placed into an opaque state (as represented by the single, bold horizontal line 908). Next, rather than providing the respective private views to right eye views of both observers (as illustrated in FIG. 8), the private views are provided in the left eye views of both observers. In particular, a left eye view 910 of the 3D image 800 (shown in FIG. 8) and a private 2D image 912 are presented to the left eye of the first observer by placing the left lens of the viewing device in a transparent state (as represented by diagonal lines 914) and the right lens of the viewing device is placed in an opaque state (as represented by the single, bold horizontal line 916). To isolate the second observer from the private view, both lens of the viewing device of the second observer are placed into an opaque state (as represented by the single, bold horizontal lines 918). A similar presentation is next provided to the second observer. For example, a right eye view 920 of the 3D image 800 and a private 2D image 922 are presented to the left eye of the second observer by placing the left lens of the viewing device in a transparent state (as represented by diagonal lines 924) and the right lens of the viewing device is placed in an opaque state (as represented by the single, bold horizontal line 926). As executed in other instances, to isolate the first observer from the private view, both lens of the viewing device of the first observer are placed into an opaque state (as represented by the single, bold horizontal lines 928). Other techniques may also be implemented for distributing the presentation of the private views for viewing by both eyes of an observer, multiple observers, assigned observer groups (e.g., assigned teams), etc.

Figure 10:
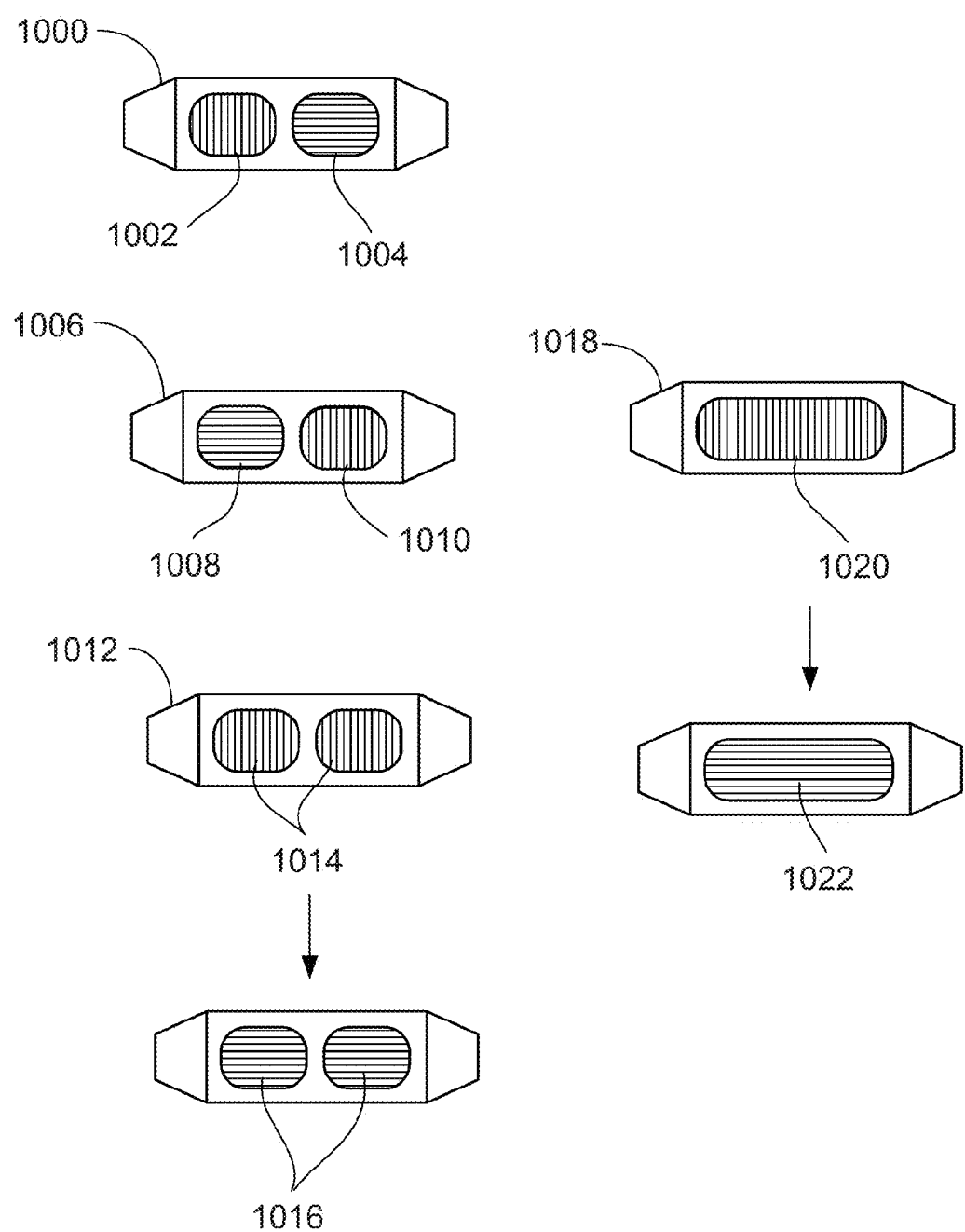
FIG. 10 illustrates user wearable devices for viewing content on a display.

Referring to FIG. 10, various types of viewing devices may be used by observers for viewing images. For example, shutter glasses technology may be implemented in which individual lens may alternate between transparent and opaque operating modes. In some arrangements, a unique identifier may be assigned to a pair of shutter glasses for determining (e.g., via a control signal) if the state of the glasses should change (e.g., switch from a phase in which the left lens is transparent and the right lens is opaque to a phase in which the left lens is opaque and the right lens is transparent). Similarly, individual lens may be assigned identifiers such that each lens may be controlled for placement in a particular state (e.g., placed in a transparent state, an opaque state, etc.). Polarization, color-filtering and other techniques may also be used to separate 2D and 3D images. For example, each lens in a pair of glasses may be produced to pass signals of one polarization while filtering out other polarizations. As such, 3D imagery may be presented to an observer at one time instance (e.g., the left eye view is presented in one polarization and the right eye view is presented in another polarization). As illustrated in the figure, one pair of example viewing glasses 1000 includes a right lens 1002 that is vertically polarized and a left lens 1004 that is horizontally polarized. Alternatively, another pair of viewing glasses 1006 includes a right lens 1008 that is horizontally polarized and a left lens 1010 that is vertically polarized. Further, in some arrangements the polarization of individual lens may be controlled. For example, by using identifiers assigned to each lens of a pair of glasses (which may or may not be assigned a unique identifier), a control signal may be received that includes data to instruct one or both of the lens to change polarization. As illustrated, a pair of glasses 1012 may include controllable lens that may adjust among two or more types of polarizations. For example, a received control signal may cause both lens to change from both being vertically polarized (as represented with the vertical lines 1014) to horizontally polarized (as represented with the horizontal line 1016). In some arrangements, viewing glasses that include a single lens may also be used. Such so-called "Cyclops" goggles may also include a lens that may be adjusted for receiving different polarizations. In one illustrative example, a pair of goggles 1018 may receive a control signal to adjust the goggles from being vertically polarized (e.g., as represented by the vertical lines 1020) to horizontally polarized (e.g., as represented by the horizontal lines 1022). In other examples, viewing glasses may implement multiple techniques, for example shutter technology and polarization techniques for receiving shared and private views.

Figure 11:
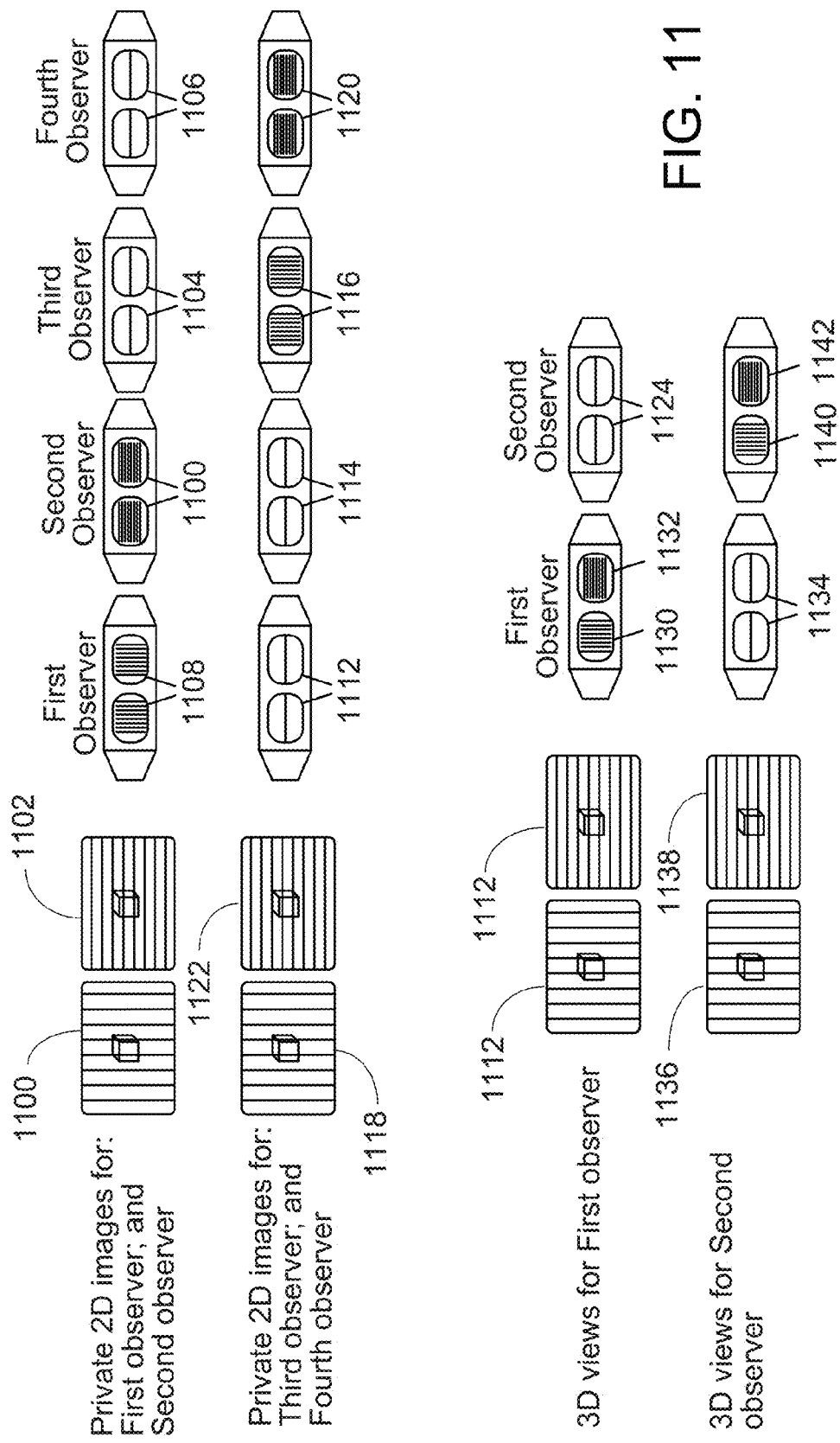

Referring to FIG. 11, by combining two or more image separation techniques (e.g., shuttering technology and polarized lens) additional image information may be presented at one time instance (e.g., by the television 200) and thereby reduce the cycles needed to provide intended imagery to one or more observers. For example, rather than presenting a single private 2D image during one time instance, two (or more) private images may be presented for being appropriately viewed by an intended observer. Further, by implementing shutter technology, one or more observers not designated to view the private views may be visually isolated. In this illustrated example, one 2D image 1100 is privately presented in one polarization (e.g., vertical polarization) for viewing by a first observer (wearing vertically polarized viewing devices) while another 2D image 1102 is privately presented in another polarization (e.g., horizontal polarization) for viewing by a second observer (wearing horizontally polarized viewing devices). In this example, neither of these two private images 1100, 1102 is to be presented to a third observer and a fourth observer. For example, a control signal may identify that the viewing devices being worn by the first and second observers (e.g., by assigned unique identifiers) are to be placed into a transparent state and the viewing devices worn by the third and fourth observers are to remain or be placed into an opaque state (as represented by the single, bold lines 1104, 1106). Placed into transparent states (based upon identifier information in the control signal), the viewing devices worn by the first observer and the second observer are able to provide one of the private images based upon their polarization. For example, wearing a vertically polarized viewing device (as represented by the vertical lines 1108), the first observer is able to privately view the 2D image 1100. Similarly, wearing a horizontally polarized viewing device (as represented by the horizontal lines 1110), the second observer is able to privately view the 2D image 1102.

In the next time instance, the third and fourth observers are presented private images while the first and second observers are now visually isolated. In particular, the third and fourth observers are identified as wearing viewing devices to be placed in a transparent state and the viewing devices worn by the first and second observers are to be placed into an opaque state (as represented by the single, bold lines 1112, 1114). Placed into transparent states (e.g., based upon identifier information in a control signal), the viewing devices worn by the third and fourth observers are able to provide one of the private images based upon their polarization. For example, wearing a vertically polarized viewing device (as represented by the vertical lines 1116), the third observer is able to privately view a 2D image 1118. Similarly, wearing a horizontally polarized viewing device (as represented by the horizontal lines 1120), the fourth observer is able to privately view the 2D image 1122. As such, by using polarization and shuttering technology, only two time instances may be needed to present private images to four observers. Based upon this time reduction, less delay may be experienced between presenting images to observers, thereby reducing the visual flicker. By presenting different imagery to observers during one time period (e.g., based on the polarization of the viewing devices worn by each observer), various types of private (or personalized) content may be provided. For example, one subtitle language (e.g., French) may be presented in one polarization (e.g., vertical polarization) while a different subtitle language (e.g., Italian) may be presented in an alternative polarization (e.g., horizontal polarization). Closed captioning or other types of content may also be presented based upon polarization, similar to two different subtitle languages. Further, since the two languages are presented based upon polarization, control signals may not be needed for preparing the viewing devices to receive the content (e.g., content presented in a vertical polarization is received by vertically polarized lenses of a viewing device without needing a polarization control signal).

Similar to using shutter technology and polarization to reduce the number of cycles to provide private 2D images to observers, the two technologies may also be used to reduce the amount of time needed to present private 3D images. For example, lenses with different polarizations may be used for receiving left eye and right eye views (of a 3D scene) that are being presented at the same time. Further, shutter technology may be used to visually isolate one or more observers to assure private viewing of the 3D image. In the illustrated example, a 3D image is provided (e.g., on the television 200) by simultaneously presenting a right eye view in one polarization (e.g., vertical polarization) and a left eye view in another polarization (e.g., horizontal polarization). Similar to the previous example, based upon a received control signal, the lenses of a viewing device being worn by a first observer are placed into a transparent state and the lenses of a viewing device being worn by a second observer are placed into an opaque state (as represented by the single, bold lines 1124). Transparent, the first observer is able to view a right eye image 1126 and a left eye image 1128 that visually combine to produce the private 3D image. In this example, to appropriately view the left and right eye images, the right eye lens of the viewing device worn by the first observer is vertically polarized (as represented by the vertical lines 1130) while the left eye lens is horizontally polarized (as represented by the horizontal lines 1132). In the next time instance, the second observer is privately presented 3D imagery while the first observer now becomes visually isolated. In particular, the lenses of a viewing device being worn by the second observer are placed into a transparent state and the lenses of a viewing device being worn by a first observer are placed into an opaque state (as represented by the single, bold lines 1134). Now transparent, the second observer is able to view a right eye image 1136 and a left eye image 1138 that visually combine to produce the private 3D image. In this example, to appropriately view the left and right eye images, the right eye lens of the viewing device worn by the second observer is vertically polarized (as represented by the vertical lines 1140) while the left eye lens is horizontally polarized (as represented by the horizontal lines 1142). As such, by using shutter technology and two different polarizations, only two presentation cycles are needed to privately provide 3D images to two observers.

Referring to FIG. 12, by presenting shared and private imagery (e.g., 2D images, 3D images, etc.) on a single display, various types of applications may be provided and/or enhanced. For example, while imagery is being presented to one or more observers, a private image may be presented to one or more particular observers. In one arrangement, each individual provided a viewing device (e.g., a pair of viewing glasses) may be identified and entered into a list (e.g., a table) along with a unique identifier assigned to the provided device. As such, each person could be targeted to receiving a private message. In a similar manner, multiple people may be targeted for receiving one or more private messages (as identified from a list) while shared imagery is provided to all of the observers. In the illustrated example, a group of individuals 1200 have been provided viewing devices and each individual is identified (e.g., asked their name) and entered into a list along with the unique identified assigned to their viewing device. The group 1200 is provided a shared viewing experience by being presented images 1202 on a single display 1204 (e.g., a television, a movie theater screen, a computer system, etc.). At some point during the performance, a private image 1206 (or images) may be presented to one individual 1208 as identified from the unique identifier assigned to the viewing device worn by the person. In this example, a shocking graphic is privately presented to the individual (e.g., to prompt a reaction from the person). In some arrangements, the targeted person (or persons) may be randomly selected (e.g., one or more unique identifiers assigned to viewing devices are selected at random) or the person (or persons) may be selected based on their name (provided by the person when picking up their viewing device) or some other characteristic (e.g., gender, approximate age guessed by the person handing out the viewing devices, etc.). After being presented the private imagery, the imagery may be removed and the person may be returned to just being presented the shared imagery (although a bit confused as to what just happened as no one else seemed to react, as represented by the person 1210). In this example, later, another private message (e.g., another shocking image 1212) may be privately presented to another individual 1214 to prompt another reaction (and possibly have the rest of the audience start to wonder what just occurred, or for proving some other type of reaction).

Figure 13:
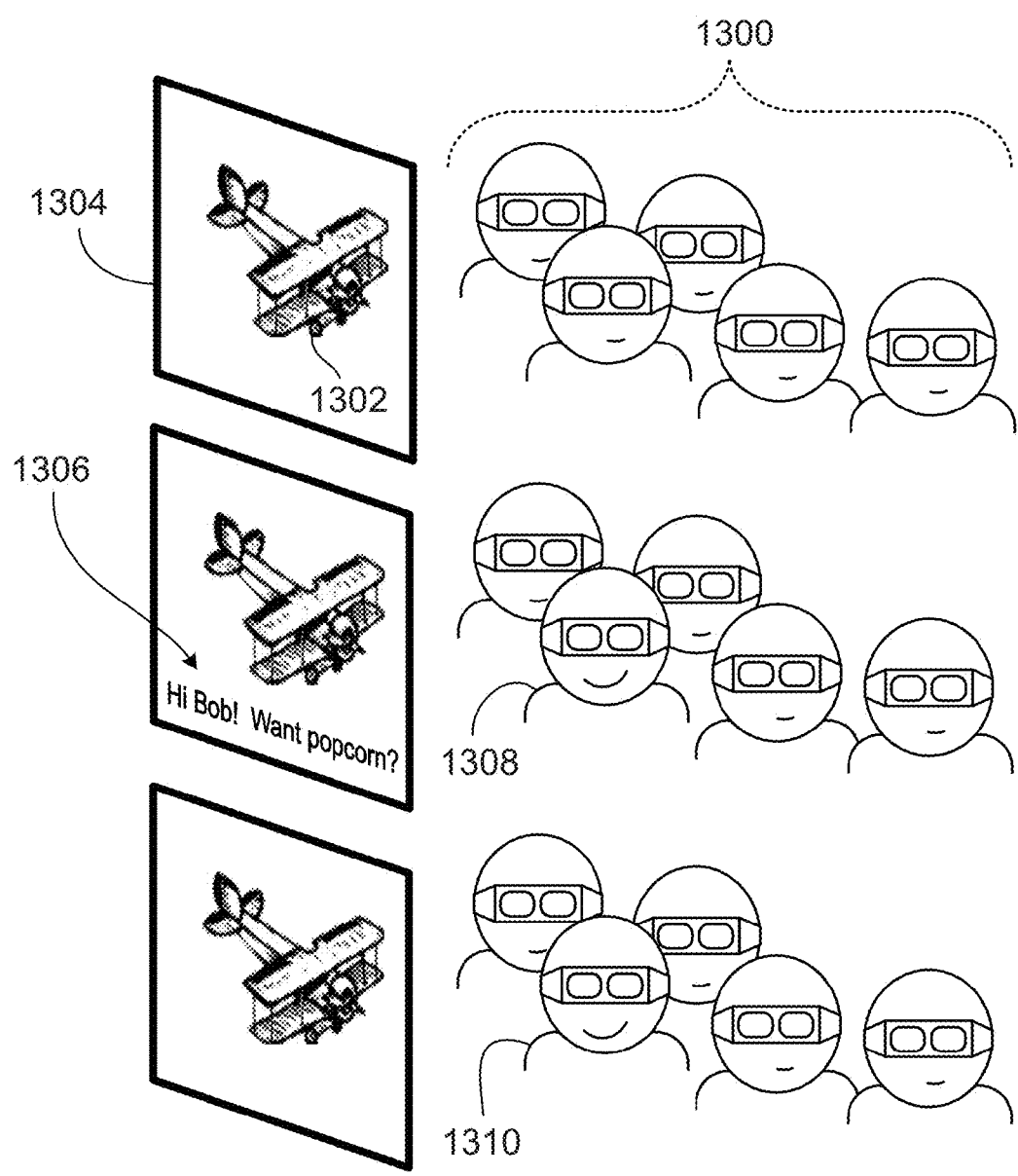

Referring to FIG. 13, various types of information and data may be presented in a private manner to one or more observers. For example, different types of textual information may be presented in one or more directed messages. As illustrated in the figure, a group of individuals 1300 may be presented imagery 1302 (e.g., a 3D motion picture) in a shared manner on a single display 1304 (e.g., a movie theater screen). During the presentation, a private image 1306 may be presented to a targeted individual 1308 (from the unique identifier assigned to the view device being worn by the individual). Various types of messages from a variety of message sources may be privately presented. For example, a textual message from another individual such as another observer (e.g., from a friend's cellular telephone or other type of computing device) may be presented. Private messages may provide various types of information, for example, the private message may provide closed caption content. Language translations may also be included in the private message. For example, the individual 1308 may be the only one (or one of a very few) at the viewing venue that can only converse in a foreign language (e.g., French, Italian, etc.). Based on this situation, the individual 1308 may be provided a viewing device (assigned a unique identifier) for privately presenting text (e.g., of the motion picture dialogue) in the person's native language. In still another example, the privately presented message may provide an emergency message (e.g., provided from the venue's management from a source external to the venue such as from an individual's home, etc.). Similar to presenting textual content, graphical content, combinations of textual and graphical content, etc. may be presented. For example, advertisements or content associated with other applications may be presented by the text, graphics, combinations, etc. Similar to the previous situations, once the message is provided, the message may be removed and the individual may be returned to the imagery being presented in the shared manner (though now aware of the message, as represented by the individual 1310).

Figure 14:
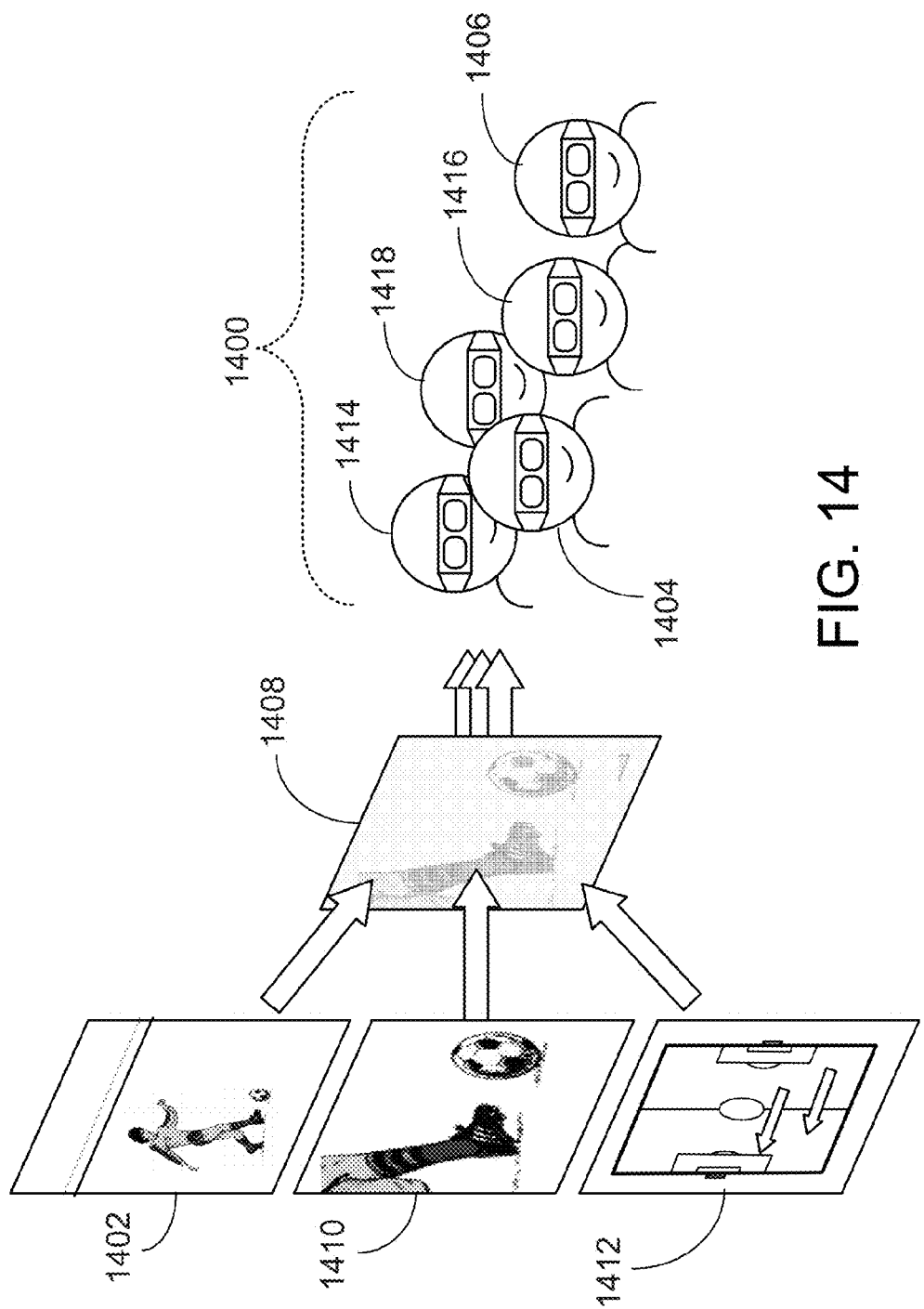

Referring to FIG. 14, along with providing messages (e.g., textual messages), other types of content may also be privately presented to one or more observers from a single display. For example, private content may include separate presentations (e.g., content from different channels such as different television stations). In one arrangement, different presentations (e.g., motion pictures, television channels, different camera angles of a sporting event, etc.) may be directed to observers based upon the unique identifiers assigned to the viewing devices being worn by the observers. As illustrated in the figure, a group of individuals 1400 are each provided a viewing device that has been assigned a unique identifier. Once a desired presentation has been selected by an individual (e.g., a different camera feed of a soccer game), the content of the selected presentation may be directed to the individual based upon the unique identifier of the viewing device being worn. In this example, content from one video feed 1402 (that provide an expanded view of the game action) has been selected by two individuals 1404, 1406 and is presented on a single display 1408 (e.g., television, theater screen, etc.) for receipt by the viewing devices worn be the two individuals. Individuals that have not selected the content are visually isolated from this privately presented content. Similarly, content from two other video feeds 1410, 1412 (e.g., a close-up view of the game action, a graphic associated with the game) are also respectively selected by individuals 1414, 1416 and 1418 and are corresponding presented to the individuals (based upon the unique identifiers assigned to their viewing devices). Similar to the observers of the video feed 1402, individuals are visually isolated from non-selected content. As such, each member of the group 1400 may select and be presented one particular type of content from one display.

Figure 15:
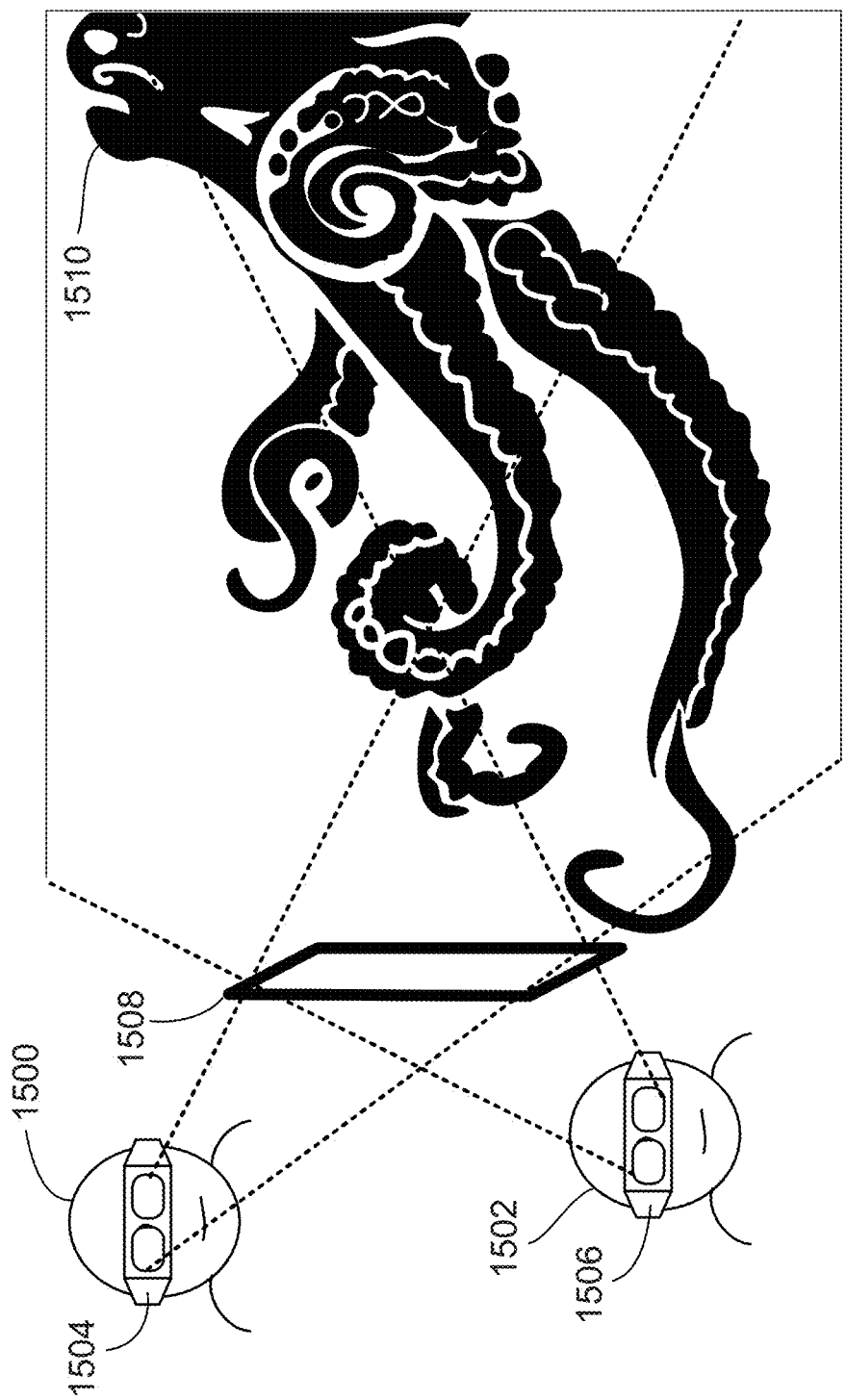

Referring to FIG. 15, similar to being presented imagery based upon a unique identifier assigned to a viewing device, imagery may be presented based upon other information associated with viewing devices. For example, the position of the viewing devices may be tracked in position and/or orientation to determine imagery to be privately presented. In this illustrated example, two individuals 1500, 1502 are located at different positions, which are tracked from their corresponding viewing devices 1504, 1506. For example, one or more beacons (e.g., electronic, visual, audible, etc.) may be transmitted from and/or received by each of the viewing devices for determining their respective locations. Other types of passive and active position finding techniques may also be utilized, which may or may not utilize unique identifiers assigned to viewing devices. Based upon their identified positions, different content may be privately presented on a single display 1508. For example, content may be privately presented to each individual such that both are provided a perspective view of a virtual environment (e.g., of a video game title) based upon their identified location. As such, each may perceive that they are being provided a view through the display 1508 of a common virtual scene (represented with a large graphic of an octopus 1510 that cannot be entirely viewed from a single perspective).

Referring to FIG. 16, private imagery for one or more individuals may also be presented based upon a predefined geometry and independent of the observer. For example, private imagery or a combination of private and shared imagery may be presented in one angular region while other imagery (e.g., private images, private and shared images, etc.) are presented in another separate and distinct angular region. As such, an observer external the angular region may be visually isolated from the imagery provided within the region. Further, since the angular regions define the imagery being presented, observers located within the regions may or may not need viewing devices (e.g., dependent upon the type of imagery being presented). In one arrangement, as illustrated in the figure, a display 1600 (e.g., that implements Lenticular technology) is capable of presenting 3D imagery based on angle of view (referred to as an "angle-of-view-based 3D screen") and is vertically positioned to define two distinct regions 1602, 1604. For individuals located within the region 1602 (e.g., an observer 1606), imagery (labeled as "image 1") may be viewed. Alternatively, observers located outside the region 1602 may be visually isolated from viewing the imagery. In a similar manner, individuals (e.g., an observer 1608) located within the region 1604 may be view imagery provided to the region by the display 1600 while individuals external to the region may be visually isolated. Similar to position the display 1600 in a vertical orientation, such displays may be placed in other orientations. For example, a display 1610 may be positioned in a horizontal orientation. As such, predefined regions 1612, 1614 may retain similar shapes and volumes (compared to the vertically oriented regions 1602, 1604), however, the orientation of the regions may similarly change with the orientation of the display (e.g., to a horizontal orientation).

Figure 17:
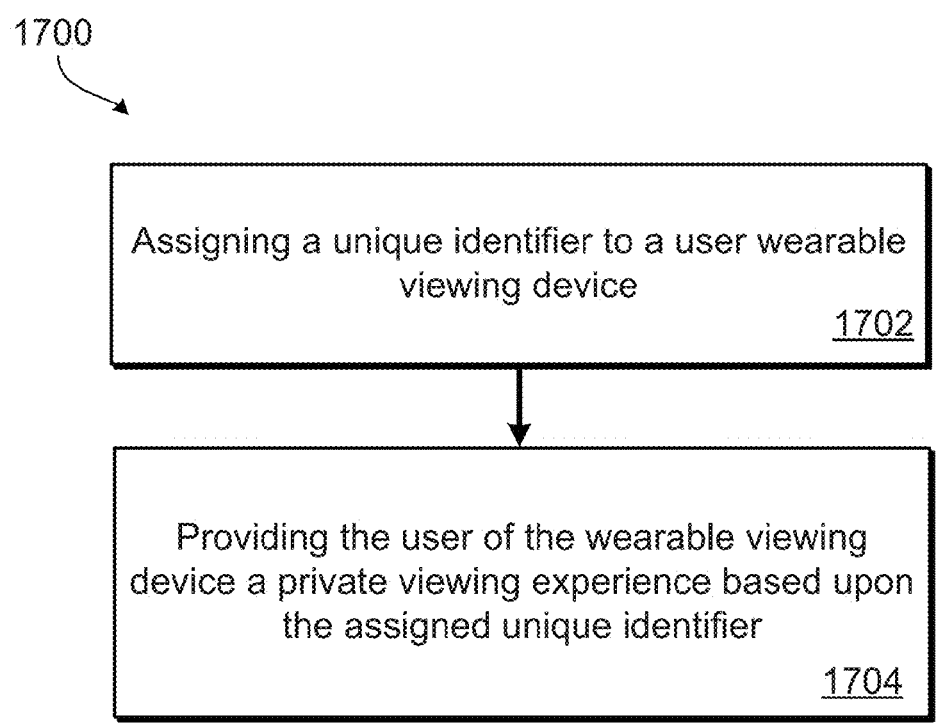
FIG. 17 is a flowchart of operations for presenting shared and private views on a single display.

Referring to FIG. 17, a flowchart 1700 represents operations of a computing device associated with providing wearable viewing devices to a user for being provided a private viewing experience. Such operations are typically executed by components (e.g., one or more processors) included in a computing device, however, operations may be executed by multiple computing devices. Along with being executed at a single site, operations execution may be distributed among two or more locations.

Operations of the computing device may include assigning 1702 a unique identifier to a user wearable viewing device. For example a unique string of alpha-numerical characters may be assigned to a pair of viewing glasses. Operations may also include providing 1704 the user of the wearable viewing device a private viewing experience based upon the assigned unique identifier. For example, the unique identified may be used to control the state of lenses included in the pair of viewing glasses to provide a private viewing experience to the user.

Figure 18:
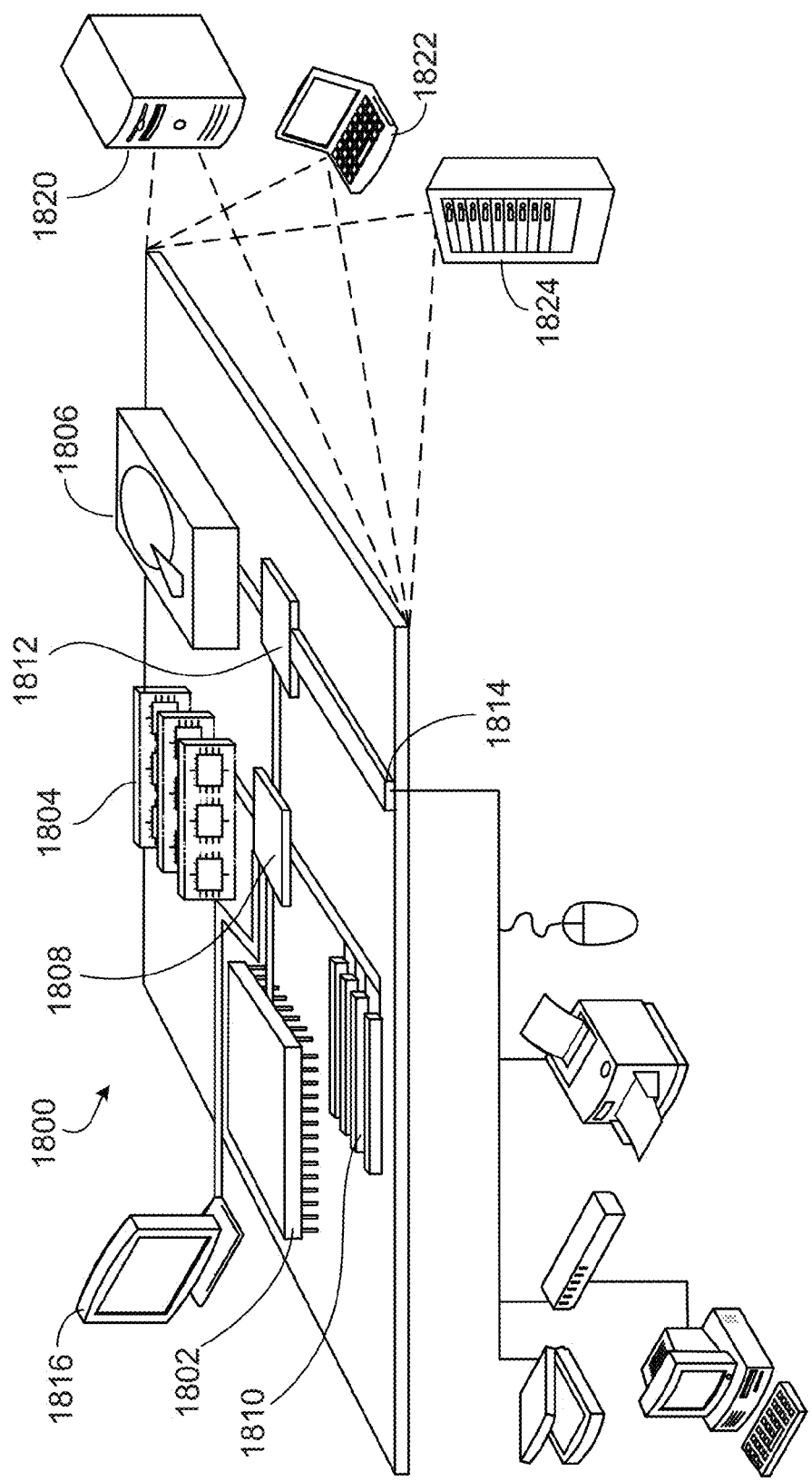
FIG. 18 shows an example of a computing device that can be used in connection with computer-implemented methods and systems described in this document.

FIG. 18 shows an example of a computing device 1800 and that can be used to implement the techniques described for presenting shared and private views by using a user wearable viewing device. The computing device 1800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1800 includes a processor 1802, a memory 1804, a storage device 1806, a high-speed interface 1808 connecting to the memory 1804 and multiple high-speed expansion ports 1810, and a low-speed interface 1812 connecting to a low-speed expansion port 1814 and the storage device 1806. Each of the processor 1802, the memory 1804, the storage device 1806, the high-speed interface 1808, the high-speed expansion ports 1810, and the low-speed interface 1812, are interconnected using various busses, and may be mounted on a common motherboard or in other manners as appropriate. The processor 1802 can process instructions for execution within the computing device 1800, including instructions stored in the memory 1804 or on the storage device 1806 to display graphical information for a GUI on an external input/output device, such as a display 1816 coupled to the high-speed interface 1808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1804 stores information within the computing device 1800. In some implementations, the memory 1804 is a volatile memory unit or units. In some implementations, the memory 1804 is a non-volatile memory unit or units. The memory 1804 may also be another form of computer-readable medium, such as a magnetic or optical disk.

The storage device 1806 is capable of providing mass storage for the computing device 1800. In some implementations, the storage device 1806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 1804, the storage device 1806, or memory on the processor 1802.

The high-speed interface 1808 manages bandwidth-intensive operations for the computing device 1800, while the low-speed interface 1812 manages lower bandwidth-intensive operations. Such allocation of functions is exemplary only. In some implementations, the high-speed interface 1808 is coupled to the memory 1804, the display 1816 (e.g., through a graphics processor or accelerator), and to the high-speed expansion ports 1810, which may accept various expansion cards (not shown). In the implementation, the low-speed interface 1812 is coupled to the storage device 1806 and the low-speed expansion port 1814. The low-speed expansion port 1814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1800 may be implemented in a number of different forms, as shown in the figure. For example, it may be implemented as a standard server 1820, or multiple times in a group of such servers. In addition, it may be implemented in a personal computer such as a laptop computer 1822. It may also be implemented as part of a rack server system 1824. Alternatively, components from the computing device 1800 may be combined with other components in a mobile device (not shown). Each of such devices may contain one or more of the computing device 1800 and the mobile computing device, and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A user wearable viewing device comprising:
    one or more lenses for assisting the user to view a representation of three dimensional content, wherein the user wearable viewing device is assigned an assigned unique identifier to provide a private viewing experience for the user;
    a receiver configured to receive a control signal, the control signal including a unique identifier and a command signal, wherein the command signal is configured to directly cause a state of the one or more lenses to change; and
    a processor configured to:
        detect whether the assigned unique identifier matches the received unique identifier; and
        perform a command corresponding to the command signal to change a state of the one or more lenses when the assigned unique identifier matches the received unique identifier, the change in the state allowing viewing of the private viewing experience through the one or more lenses, wherein an additional change in state of the one or more lenses occurs only when an additional command signal is received and when a unique identifier associated with the additional command signal matches the assigned unique identifier.

2. The user wearable viewing device of claim 1, wherein the private viewing experience includes at least one of three dimensional content, two dimensional content and a combination of three dimensional content and two dimensional content.

3. The user wearable viewing device of claim 1, wherein the assigned unique identifier provides a shared viewing experience for the user with one or more other users.

4. The user wearable viewing device of claim 3, wherein the shared viewing experience includes at least one of three dimensional content, two dimensional content and a combination of three dimensional content and two dimensional content.

5. The user wearable viewing device of claim 1, wherein the assigned unique identifier allows the viewing device to visually isolate the user.

6. The user wearable viewing device of claim 1, wherein the unique identifier includes a numerical value uniquely assigned to the user wearable viewing device.

7. The user wearable viewing device of claim 1, wherein the one or more lenses include a left eye lens and a right eye lens.

8. The user wearable viewing device of claim 7, wherein another unique identifier is assigned to the left eye lens for controlling operations of the left eye lens.

9. The user wearable viewing device of claim 7, wherein another unique identifier is assigned to the right eye lens for controlling operations of the right eye lens.

10. A computer-implemented method comprising:
    obtaining an assigned unique identifier assigned to a user wearable viewing device that assists the user in viewing a representation of three dimensional content, wherein the assigned unique identifier is capable of being used to provide a private viewing experience for the user;

receiving a control signal, the control signal including a unique identifier and a command signal, wherein the command signal is configured to directly cause a state of the user wearable viewing device to change;

detecting whether the assigned unique identifier matches the received unique identifier; and performing a command corresponding to the command signal to change a state of the user wearable viewing device when the assigned unique identifier matches the received unique identifier, the change in the state allowing viewing of the private viewing experience through the user wearable viewing device, wherein an additional change in state of the user wearable viewing device occurs only when an additional command signal is received and when a unique identifier associated with the additional command signal matches the assigned unique identifier.

11. The computer-implemented method of claim 10, wherein the private viewing experience includes at least one of three dimensional content, two dimensional content and a combination of three dimensional content and two dimensional content.

12. The computer-implemented method of claim 10, wherein the assigned unique identifier provides a shared viewing experience for the user with one or more other users.

13. The computer-implemented method of claim 12, wherein the shared viewing experience includes at least one of three dimensional content, two dimensional content and a combination of three dimensional content and two dimensional content.

14. The computer-implemented method of claim 10, wherein the assigned unique identifier allows the viewing device to visually isolate the user.

15. The computer-implemented method of claim 10, wherein the unique identifier includes a numerical value uniquely assigned to the user wearable viewing device.

16. The computer-implemented method of claim 10, wherein the user wearable viewing device includes a left eye lens and a right eye lens.

17. The computer-implemented method of claim 16, wherein another unique identifier is assigned to the left eye lens for controlling operations of the left eye lens.

18. The computer-implemented method of claim 16, wherein another unique identifier is assigned to the right eye lens for controlling operations of the right eye lens.

19. A computer program product tangibly embodied in a non-transitory information carrier and comprising instructions that when executed by a processor perform a method comprising:

obtaining an assigned unique identifier assigned to a user wearable viewing device that assists the user in viewing a representation of three dimensional content, wherein the assigned unique identifier is capable of being used to provide a private viewing experience for the user;

receiving a control signal, the control signal including a unique identifier and a command signal, wherein the command signal is configured to directly cause a state of the user wearable viewing device to change;

detecting whether the assigned unique identifier matches the received unique identifier; and performing a command corresponding to the command signal to change a state of the user wearable viewing device when the assigned unique identifier matches the received unique identifier, the change in the state allowing viewing of the private viewing experience through the user wearable viewing device, wherein an additional change in state of the user wearable viewing device occurs only when an additional command signal is received and when a unique identifier associated with the additional command signal matches the assigned unique identifier.

20. The computer program product of claim 19, wherein the private viewing experience includes at least one of three dimensional content, two dimensional content and a combination of three dimensional content and two dimensional content.

21. The computer program product of claim 19, wherein the assigned unique identifier provides a shared viewing experience for the user with one or more other users.

22. The computer program product of claim 21, wherein the shared viewing experience includes at least one of three dimensional content, two dimensional content and a combination of three dimensional content and two dimensional content.

23. The computer program product of claim 19, wherein the assigned unique identifier allows the viewing device to visually isolate the user.

24. The computer program product of claim 19, wherein the unique identifier includes a numerical value uniquely assigned to the user wearable viewing device.

25. The computer program product of claim 19, wherein the user wearable viewing device includes a left eye lens and a right eye lens.

26. The computer program product of claim 25, wherein another unique identifier is assigned to the left eye lens for controlling operations of the left eye lens.

27. The computer program product of claim 25, wherein another unique identifier is assigned to the right eye lens for controlling operations of the right eye lens.

* * * * *